United States Patent
Noh et al.

(10) Patent No.: US 9,756,674 B2
(45) Date of Patent: Sep. 5, 2017

(54) METHOD OF TRANSMITTING AND RECEIVING DATA OF ELECTRONIC DEVICE AND ELECTRONIC DEVICE USING THE METHOD

(71) Applicant: Samsung Electronics Co., Ltd., Gyeonggi-do (KR)

(72) Inventors: Jusung Noh, Gyeonggi-do (KR); Seokjoong Lee, Gyeonggi-do (KR); Jongwoo Lee, Gyeonggi-do (KR); Donghyun Yeom, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/932,626

(22) Filed: Nov. 4, 2015

(65) Prior Publication Data
US 2016/0128120 A1     May 5, 2016

(30) Foreign Application Priority Data
Nov. 4, 2014 (KR) ..................... 10-2014-0151913

(51) Int. Cl.
*H04W 76/02* (2009.01)
*H04W 4/00* (2009.01)
(Continued)

(52) U.S. Cl.
CPC .......... *H04W 76/023* (2013.01); *H04B 1/385* (2013.01); *H04W 4/008* (2013.01); *H04W 4/14* (2013.01)

(58) Field of Classification Search
CPC ..... H04W 76/023; H04W 4/008; H04W 4/14; H04B 1/385
(Continued)

(56) References Cited

U.S. PATENT DOCUMENTS 7,969,990 B2 * 6/2011 Shmueli ............... H04L 67/303
                                                        370/271
8,918,232 B2 * 12/2014 Lavi ..................... G07C 5/008
                                                        455/421
(Continued)

FOREIGN PATENT DOCUMENTS

EP     2 073 513     6/2009
EP     2 434 721     3/2012
(Continued)

OTHER PUBLICATIONS

European Search Report dated Feb. 25, 2016 issued in counterpart application No. 15192810.8-1870, 7 pages.
(Continued)

*Primary Examiner* — Hai V Nguyen
(74) *Attorney, Agent, or Firm* — The Farrell Law Firm, P.C.

(57) ABSTRACT

A method of operating an electronic device, an electronic device, and a chip set are provided. The method includes detecting a generation of an event based on at least one of a signal received externally and an internal operation, by the electronic device including a cellular communication module, a first short range wireless communication module and a second short range wireless communication module; determining at least one state of a connection between the electronic device and a first external electronic device that has been connected to the electronic device using the first short range wireless communication module, by the electronic device; and transmitting a signal related to the event, using at least one of the cellular communication module, the first short range wireless communication module and the second short range wireless communication module, based on at least one of the at least one state of the connection (Continued)

between the electronic device and the first external electronic device, by the electronic device.

31 Claims, 16 Drawing Sheets

(51) Int. Cl.
 *H04W 4/14* (2009.01)
 *H04B 1/3827* (2015.01)
(58) Field of Classification Search
 USPC ........................................................ 455/41.2
 See application file for complete search history.

(56) References Cited

U.S. PATENT DOCUMENTS

| | | | |
|---|---|---|---|
| 9,026,840 B1* | 5/2015 | Kim | G06F 21/552 |
| | | | 714/4.3 |
| 9,049,515 B2* | 6/2015 | Clow | H04R 1/1091 |
| 9,054,961 B1* | 6/2015 | Kim | H04L 41/0806 |
| 9,074,892 B2* | 7/2015 | Fink | G01C 21/00 |
| 9,414,426 B2* | 8/2016 | Park | H04W 76/028 |
| 9,560,324 B2* | 1/2017 | Monaghan, Sr. | G02B 27/017 |
| 2004/0017788 A1* | 1/2004 | Shmueli | H04L 65/60 |
| | | | 370/328 |
| 2008/0107067 A1 | 5/2008 | Baek et al. | |
| 2011/0171937 A1* | 7/2011 | Hill | H04B 5/0031 |
| | | | 455/412.2 |
| 2011/0221623 A1* | 9/2011 | Yano | G08C 17/02 |
| | | | 341/176 |
| 2011/0261176 A1* | 10/2011 | Monaghan, Sr. | G02B 27/017 |
| | | | 348/61 |
| 2012/0108215 A1* | 5/2012 | Kameli | H04M 1/0256 |
| | | | 455/412.2 |
| 2012/0246301 A1* | 9/2012 | Vyrros | A63F 13/335 |
| | | | 709/224 |
| 2013/0303087 A1* | 11/2013 | Hauser | H04W 4/206 |
| | | | 455/41.2 |
| 2014/0025746 A1 | 1/2014 | Rhee et al. | |
| 2014/0038560 A1* | 2/2014 | Lee | H04W 4/16 |
| | | | 455/411 |
| 2014/0098983 A1* | 4/2014 | Clow | H04R 1/1091 |
| | | | 381/375 |
| 2014/0108151 A1* | 4/2014 | Bookstaff | G06Q 10/00 |
| | | | 705/14.64 |
| 2014/0200740 A1* | 7/2014 | Lavi | G07C 5/008 |
| | | | 701/2 |
| 2014/0273975 A1* | 9/2014 | Barat | G06F 15/17312 |
| | | | 455/412.2 |
| 2014/0278075 A1* | 9/2014 | Fink | G01C 21/00 |
| | | | 701/468 |
| 2015/0035644 A1* | 2/2015 | June | G07C 11/00 |
| | | | 340/5.61 |
| 2015/0065082 A1* | 3/2015 | Sehgal | H04W 4/22 |
| | | | 455/404.2 |
| 2015/0134459 A1* | 5/2015 | Dipaola | G06Q 30/0267 |
| | | | 705/14.64 |
| 2015/0154642 A1* | 6/2015 | Dipaola | G06Q 30/0267 |
| | | | 705/14.58 |
| 2015/0230067 A1* | 8/2015 | Lee | H04W 4/16 |
| | | | 455/412.2 |
| 2015/0230285 A1* | 8/2015 | Park | H04W 76/028 |
| | | | 455/41.2 |
| 2015/0260527 A1* | 9/2015 | Fink | G01C 21/00 |
| | | | 701/468 |
| 2015/0358818 A1* | 12/2015 | Dipaola | G06Q 30/0261 |
| | | | 726/4 |
| 2016/0061613 A1* | 3/2016 | Jung | G01C 21/3632 |
| | | | 701/49 |
| 2016/0112870 A1* | 4/2016 | Pathuri | H04L 63/104 |
| | | | 726/4 |
| 2016/0119284 A1* | 4/2016 | Kim | H04L 63/02 |
| | | | 726/12 |
| 2016/0285717 A1* | 9/2016 | Kim | H04L 43/0823 |

FOREIGN PATENT DOCUMENTS

| | | |
|---|---|---|
| EP | 2 693 730 | 2/2014 |
| KR | 10-0909014 | 7/2009 |
| KR | 10-2010-0078556 | 7/2010 |
| KR | 10-2014-0015737 | 2/2014 |

OTHER PUBLICATIONS

International Search Report dated Mar. 31, 2016 issued in counterpart application No. PCT/KR2015/011746, 4 pages.
European Search Report dated Sep. 30, 2016 issued in counterpart application No. 15192810.8-1870, 70 pages.

* cited by examiner

METHOD OF TRANSMITTING AND RECEIVING DATA OF ELECTRONIC DEVICE AND ELECTRONIC DEVICE USING THE METHOD

PRIORITY

This application claims priority under 35 U.S.C. §119(a) to a Korean Patent Application filed on Nov. 4, 2014 in the Korean Intellectual Property Office and assigned Serial No. 10-2014-0151913, the entire disclosure of which is incorporated herein by reference.

BACKGROUND

1. Field of the Invention

The present invention relates generally to a method of transmitting and receiving data and an electronic device using the method, and more particularly, to a method of transmitting and receiving data from a main device using a connection to a previously registered sub-device even though a bridge connection device is disconnected from the main device, and an electronic device using the method.

2. Description of the Related Art

An electronic device such as a portable terminal may exchange data related to a random event between the electronic device and another electronic device using a communication module. An electronic device may be connected to another electronic device through short range wireless communication in order to exchange data related to a random event.

An electronic device may transmit and receive various events, such as a call connection, a message transmission, and playing music, using a pairing through a wireless connection (e.g., Bluetooth) with a certain terminal even during a short range wireless communication. In addition, when different electronic devices are connected to each other, a consistent connection is possible only when the distance between the connected devices is shorter than a transmission and reception distance. Therefore, when the distance between connected devices becomes greater than a transmission and reception distance, the connection is lost (i.e., the devices become disconnected). Thus, it may not be possible to transmit and receive data related to a random event between the devices.

SUMMARY

An aspect of the present invention provides a device for and a method of transmitting and receiving data related to a random event generated from a main device using a connection to a previously registered sub-device even though a bridge connection device is disconnected from the main device. In this case, the bridge connection device may indicate a device capable of receiving an event generated from a certain terminal through a third electronic device. That is, the third electronic device acts as a bridge for transferring the event from the certain terminal to the bridge connection device. Through such a bridge connection, a limited communication method (e.g., Bluetooth) of the third device may be used, and specially, utilization of an electronic device as the third device, such as a wearable device using a wireless connection (e.g., Bluetooth), as the primary means of communication with the certain terminal may be improved.

According to an aspect of the present invention, a method of operating an electronic device is provided. The method includes detecting a generation of an event based on at least one of a signal received externally and an internal operation, by the electronic device including a cellular communication module, a first short range wireless communication module and a second short range wireless communication module; determining at least one state of a connection between the electronic device and a first external electronic device that has been connected to the electronic device using the first short range wireless communication module, by the electronic device; and transmitting a signal related to the event, using at least one of the cellular communication module, the first short range wireless communication module and the second short range wireless communication module, based on at least one of the at least one state of the connection between the electronic device and the first external electronic device, by the electronic device.

According to another aspect of the present invention, a method of operating an electronic device is provided. The method includes detecting a generation of an event based on at least one of a signal received externally and an internal operation, by the electronic device including a first wireless communication module and a second wireless communication module; determining whether the electronic device is connected to a first external electronic device that has been connected to the electronic device using the first wireless communication module, by the electronic device; and transferring information on whether the event is generated to the first external electronic device, by transmitting a signal related to the event using the second wireless communication module, by the electronic device, if the electronic device is disconnected from the first external electronic device.

According to another aspect of the present invention, a method of operating a wearable electronic device is provided. The method includes determining at least one state of a connection between the wearable electronic device and a first external electronic device that has been connected to the wearable electronic device using a first short range wireless communication module, by the wearable electronic device including the first short range wireless communication module; and receiving, from a second external electronic device, a signal related to an event generated in the first external electronic device, using at least one of the first short range wireless communication module and the second short range wireless communication module, based on at least one of the at least one state of the connection between the wearable electronic device and the first external electronic device, by the wearable electronic device.

According to another aspect of the present invention, a method of operating an electronic device is provided. The method includes connecting the electronic device to a first external electronic device using a short range wireless communication module; transmitting information on whether the electronic device is connected to the first external electronic device to a second external electronic device, if the electronic device is connected to the first external electronic device; receiving a signal related to an event based on at least one of a signal received externally to the second external electronic device and an internal operation, from the second external electronic device; and transmitting the signal related to the event to the first external electronic device.

According to another aspect of the present invention, an electronic device is provided. The electronic device includes a cellular communication module; a first short range wireless communication module; a second short range wireless communication module; a processor connected to the cellular communication module, the first short range wireless communication module and the second short range wireless communication module, and configured to detect a generation of an event based on at least one of a signal received externally and an internal operation; determine a state of a connection between the electronic device and a first external electronic device that has been connected to the electronic device using the first short range wireless communication module; and transmit a signal related to the event, using at least one of the cellular communication module, the first short range wireless communication module, and the second short range wireless communication module, based on at least one state of the connection; and a memory.

According to another aspect of the present invention, an electronic device is provided. The electronic device includes a first wireless communication module; a second wireless communication module; a processor connected to the first wireless communication module and the second wireless communication module, and configured to detect a generation of an event based on at least one of a signal received externally and an internal operation; determine whether the electronic device is connected to a first external electronic device that has been connected to the electronic device using the first wireless communication module; and transfer information on whether the event is generated to the first external electronic device, by transmitting a signal related to the event using the second wireless communication module, if the connection is disconnected; and a memory.

According to another aspect of the present invention, an electronic device is provided. The electronic device includes a first short range wireless communication module; a second short range wireless communication module; a processor connected to the first short range wireless communication module and the second short range wireless communication module, and configured to determine a state of a connection between the wearable electronic device and a first external electronic device that has been connected to the wearable electronic device using the first short range wireless communication module; and receive, from a second external electronic device, a signal related to an event generated in the first external electronic device, using at least one of the first short range wireless communication module and the second short range wireless communication module, based on at least one state of the connection; and a memory.

According to another aspect of the present invention, an electronic device is provided. The electronic device includes a short range wireless communication module; a processor connected to the short range wireless communication module, and configured to connect the electronic device to a first external electronic device using the short range wireless communication module; transmit information on whether the electronic device is connected to the first external electronic device to a second external electronic device, if the electronic device is connected to the first external electronic device; receive a signal related to an event based on at least one of a signal received externally to the second external electronic device and an internal operation, from the second external electronic device; and transmit the signal related to the event to the first external electronic device; and a memory.

According to another aspect of the present invention, a chip set for operating an electronic device is provided. The chip set is configured to detect a generation of an event based on at least one of a signal received externally and an internal operation, by the electronic device including a cellular communication module, a first short range wireless communication module and a second short range wireless communication module; determine at least one state of a connection between the electronic device and a first external electronic device that has been connected to the electronic device using the first short range wireless communication module, by the electronic device; and transmit a signal related to the event, using at least one of the cellular communication module, the first short range wireless communication module and the second short range wireless communication module, based on at least one of the at least one state of the connection between the electronic device and the first external electronic device, by the electronic device.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
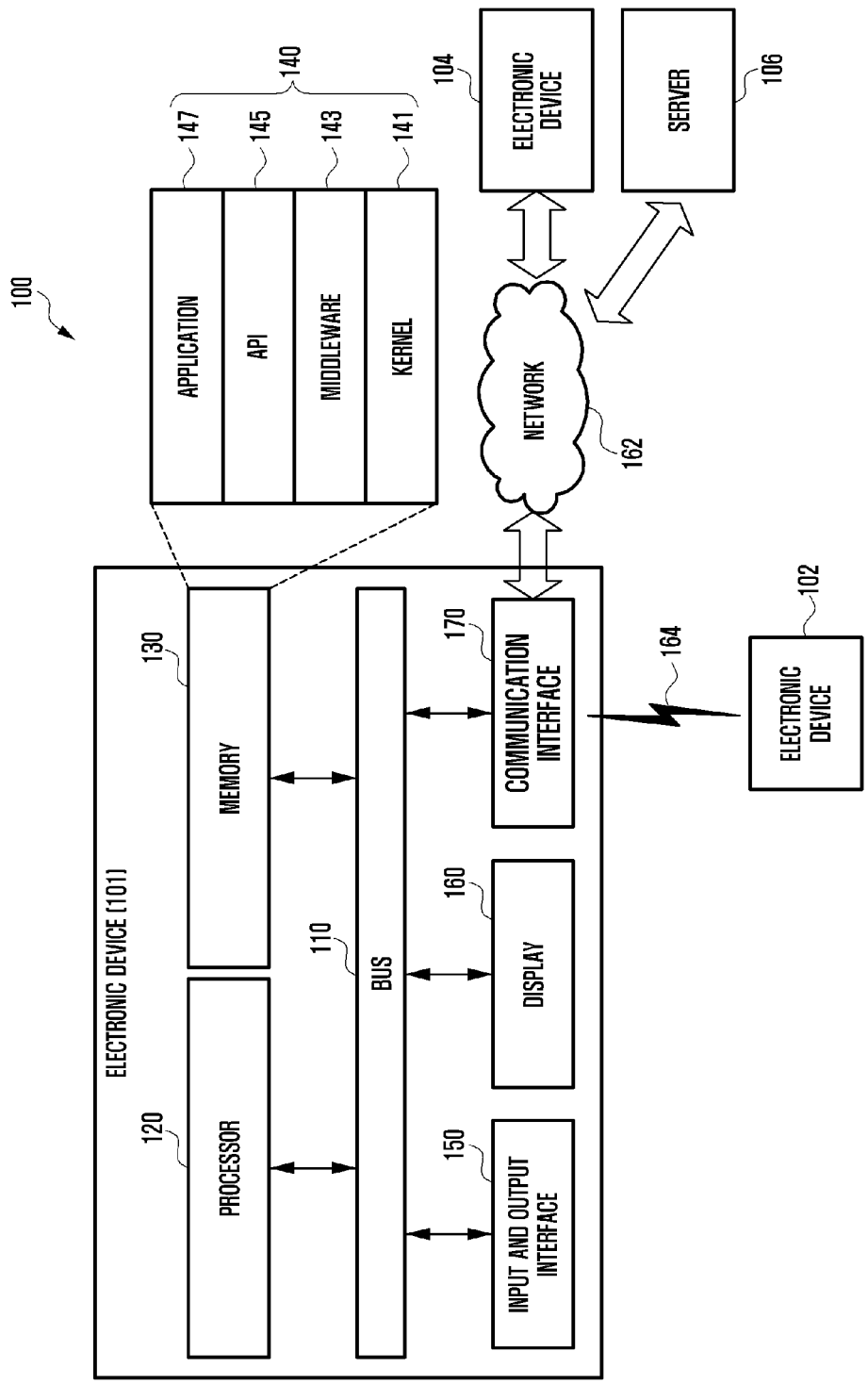
FIG. 1 is a block diagram of a network environment including an electronic device according to an embodiment of the present invention.

Hereinafter, embodiments of the present invention are described in detail with reference to the accompanying drawings. While the present invention may be embodied in many different forms, certain embodiments of the present invention are shown in the accompanying drawings and are described herein in detail, with the understanding that the present invention is not intended to be limited to the embodiments. The same reference numbers are used throughout the accompanying drawings to refer to the same or like parts.

The expressions "comprising" and "may comprise" used in the present disclosure indicate the presence of a corresponding function, operation, or element and do not limit additional at least one function, operation, or element. Further, in the present disclosure, the terms "comprise" and "have" indicate the presence of a characteristic, numeral, step, operation, element, component, or combination thereof described in the present invention and does not exclude the presence or addition of at least one other characteristic, numeral, step, operation, element, component, or combination thereof.

In the present disclosure, the expression "or" includes any combination or the entire combination of words listed together. For example, "A or B" may include A, B, or A and B.

The expressions "first" and "second" in the present disclosure may represent various elements of the present invention, but do not limit corresponding elements. For example, the expressions do not limit order and/or importance of corresponding elements. The expressions may be used for distinguishing one element from another element. For example, both a first user device and a second user device are user devices and represent different user devices. For example, a first element may be referred to as a second element without deviating from the scope and spirit of the present invention, and similarly, a second element may be referred to as a first element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not intended to limit the present invention but merely illustrate embodiments of the present invention. When used in a description of the present invention, a singular form includes a plurality of forms unless it is explicitly represented differently.

Unless defined differently, terms used herein have the same meanings as the meanings that may be generally understood by a person of ordinary skill in the art. It should be understood that terms defined in a dictionary have a meaning corresponding to that of a context of related technology and are not intended to be understood as having an ideal or excessively formal meaning unless explicitly defined as such herein.

In the present invention, an electronic device may be a device that involves a communication function. For example, an electronic device may be a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group Audio Layer 3 (MP3) player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

According to an embodiment, an electronic device may be a smart home appliance that involves a communication function. For example, an electronic device may be a TV, a Digital Video Disk (DVD) player, audio equipment, a refrigerator, an air conditioner, a vacuum cleaner, an oven, a microwave oven, a washing machine, an air cleaner, a set-top box, a TV box (e.g., Samsung HomeSync™, Apple TV®, Google TV™, etc.), a game console, an electronic dictionary, an electronic key, a camcorder, or an electronic picture frame.

According to an embodiment of the present invention, an electronic device may be a medical device (e.g., a Magnetic Resonance Angiography (MRA) device, a Magnetic Resonance Imaging (MRI) device, a Computed Tomography (CT) device, an ultrasonography device, etc.), a navigation device, a Global Positioning System (GPS) receiver, an Event Data Recorder (EDR), a Flight Data Recorder (FLD), a car infotainment device, electronic equipment for ship (e.g., a marine navigation system, a gyrocompass, etc.), avionics, security equipment, or an industrial or home robot.

According to an embodiment of the present invention, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and are not intended to limit the present invention.

FIG. 1 is a block diagram of a network environment 100 including an electronic device 101 according to an embodiment of the present invention.

Referring to FIG. 1, the electronic device 101 may include a bus 110, a processor 120, a memory 130, an input and output interface 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the input and output interface 150, the display 160, and the communication interface 170, through, for example, the bus 110, decipher the received commands, and perform operations and/or data processing according to the deciphered commands.

The memory 130 can store commands received from the processor 120 and/or other elements, e.g. the input and output interface 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic device 101.

The middleware 143 can perform a relay function which allows the API 145 and/or the application 147 to communicate and exchange data with the kernel 141. Further, in relation to operation requests received from at least one of the application 147, the middleware 143 can perform load balancing in relation to the operation requests by, for example, giving a priority in using a system resource, e.g. the bus 110, the processor 120, and/or the memory 130, of the electronic device 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input and output interface 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic device 101 and other electronic devices 102 and 104 and/or a server 106. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wide Area Network (WAN), a telecommunication network, a cellular network, a satellite network, a Plain Old Telephone Service (POTS), or any other similar and/or suitable communication network, such as a network 162, or the like. The electronic devices 102 and 104 may be the same, or different, type of electronic device.

Figure 2:
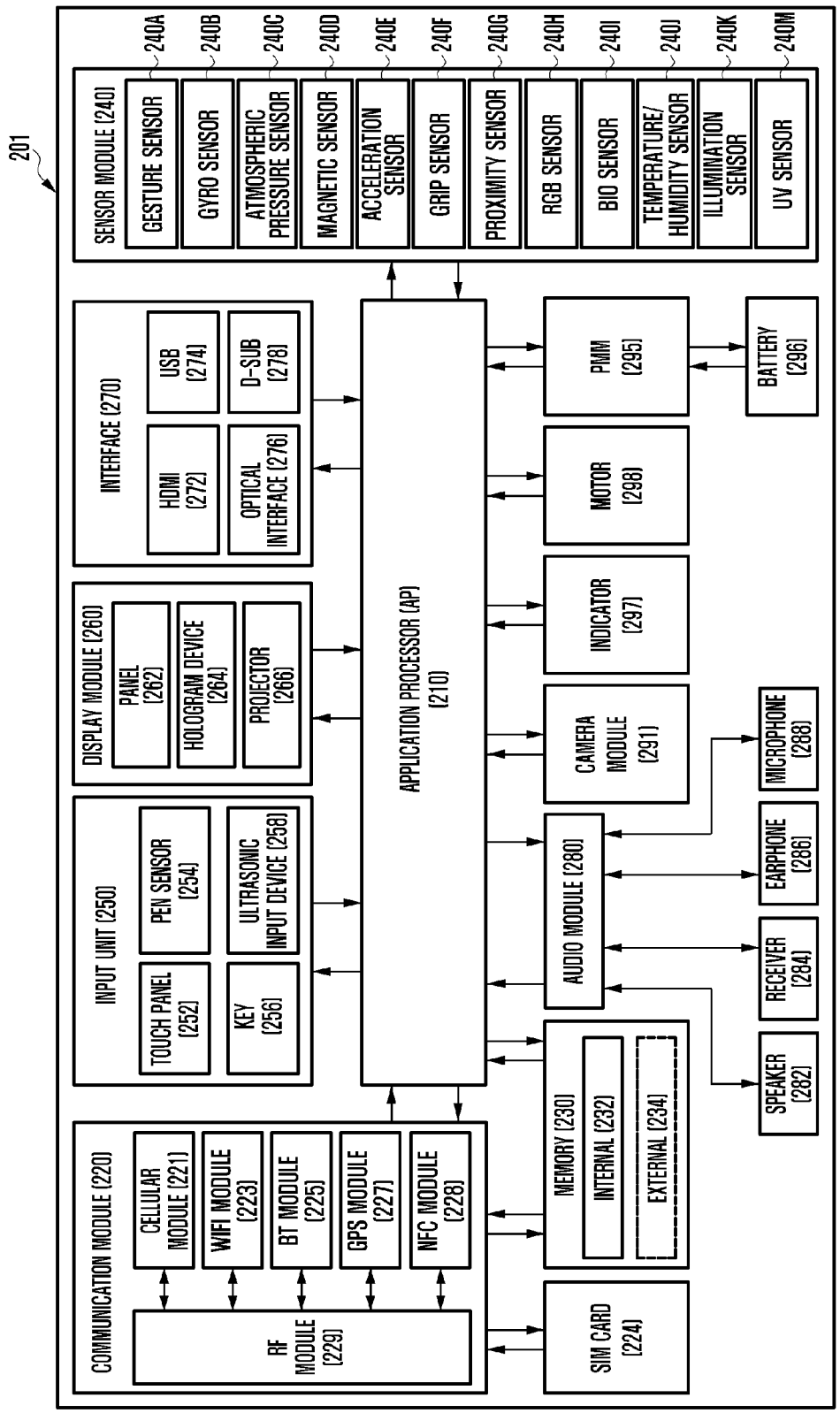
FIG. 2 is a block diagram of an electronic device according to an embodiment of the present invention.

FIG. 2 is a block diagram of an electronic device 201 in accordance with an embodiment of the present invention. The electronic device 201 may form, for example, all or a part of the electronic device 101 shown in FIG. 1.

Referring to FIG. 2, the electronic device 201 may include at least one Application Processor (AP) 210, a communication module 220, a Subscriber Identification Module (SIM) card 224, a memory 230, a sensor module 240, an input unit 250, a display module 260, an interface 270, an audio module 280, a camera module 291, a power management module 295, a battery 296, an indicator 297, and a motor 298.

The AP 210 may drive an operating system or applications, control a plurality of hardware or software components connected thereto, and perform processing and operations for various data including multimedia data. The AP 210 may be formed of a System-on-Chip (SoC), for example.

According to an embodiment of the present invention, the AP 210 may further include a Graphics Processing Unit (GPU).

The communication module 220 (e.g., the communication interface 170) may perform a data communication with the electronic device 104 or the server 106 connected to the electronic device 201 (e.g., the electronic device 101 of FIG. 1) through the network 162. According to an embodiment of the present invention, the communication module 220 may include therein a cellular module 221, a WiFi module 223, a BT module 225, a GPS module 227, an NFC module 228, and a Radio Frequency (RF) module 229.

The cellular module 221 may offer a voice call, a video call, a message service, an Internet service, or the like through a communication network (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM), etc.). Additionally, the cellular module 221 may perform identification and authentication of the electronic device 201 in the communication network, using the SIM card 224. According to an embodiment of the present invention, the cellular module 221 may perform at least part of the functions that the AP 210 can provide. For example, the cellular module 221 may perform at least part of a multimedia control function.

According to an embodiment of the present invention, the cellular module 221 may include a Communication Processor (CP). Additionally, the cellular module 221 may be formed of an SoC, for example. Although some elements such as the cellular module 221 (e.g., the CP), the memory 230, or the power management module 295 are shown as separate elements being different from the AP 210 in FIG. 2, the AP 210 may be formed to have at least a part (e.g., the cellular module 221) of the above elements in an embodiment of the present invention.

According to an embodiment of the present invention, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created by one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least a part of them may be contained in a single Integrated Circuit (IC) (or chip) or a single IC package in an embodiment of the present invention. For example, at least a part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other type of electrical signal. The RF module 229 may include a transceiver, a Power Amplifier Module (PAM), a frequency filter, a Low Noise Amplifier (LNA), or the like. In addition, the RF module 229 may include any component, e.g., a wire or a conductor, for transmission of electromagnetic waves in free space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a certain card inserted into a slot 225_1 to 225_N formed at a certain location in the electronic device 201. The SIM card 224_1 to 224_N may contain therein an Integrated Circuit Card IDentifier (ICCID) or an International Mobile Subscriber Identity (IMSI).

The memory 230 (e.g., the memory 130 of FIG. 1) may include an internal memory 232 and an external memory 234. The internal memory 232 may include, for example, at least one of a volatile memory (e.g., a Dynamic Random Access Memory (DRAM), a Static RAM (SRAM), a Synchronous DRAM (SDRAM), etc.) or a nonvolatile memory (e.g., a One Time Programmable Read Only Memory (OTPROM), a Programmable ROM (PROM)), an Erasable and Programmable ROM (EPROM), an Electrically Erasable and Programmable ROM (EEPROM), a mask ROM, a flash ROM, a NAND flash memory, a NOR flash memory, etc.).

According to an embodiment of the present invention, the internal memory 232 may have the form of a Solid State Drive (SSD). The external memory 234 may include a flash drive, e.g., a Compact Flash (CF) drive, a Secure Digital (SD) memory card, a Micro Secure Digital (Micro-SD) memory card, a Mini Secure Digital (Mini-SD) memory card, eXtreme Digital (xD) memory card, memory stick, or the like. The external memory 234 may be functionally connected to the electronic device 201 through various interfaces. According to an embodiment of the present invention, the electronic device 201 may further include a storage device or medium such as a hard drive.

The sensor module 240 may measure a physical quantity or sense an operating status of the electronic device 201, and then convert measured or sensed information into electrical signals. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature-humidity sensor 240J, an illumination sensor 240K, and an ultraviolet (UV) light sensor 240M. Additionally or alternatively, the sensor module 240 may include, e.g., an Electronic nose (E-nose) sensor, an ElectroMyoGraphy (EMG) sensor, an ElectroEncephaloGram (EEG) sensor, ElectroCardioGram (ECG) sensor, an InfaRed (IR) sensor, an iris scan sensor, or a finger scan sensor. Also, the sensor module 240 may include a control circuit for controlling one or more sensors equipped therein.

The input unit 250 may include a touch panel 252, a digital pen sensor 254, a key 256, or an ultrasonic input device 258. The touch panel 252 may recognize a touch input in a manner of capacitive type, resistive type, infrared type, or ultrasonic type. In addition, the touch panel 252 may further include a control circuit. In the case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input device 258 is a certain device capable of identifying data by sensing sound waves with a microphone 288 in the electronic device 201 through an input tool that generates ultrasonic signals, thus allowing wireless recognition. According to an embodiment of the present invention, the electronic device 201 may receive a user input from any external device (e.g., a computer or a server) connected thereto through the communication module 220.

The display module 260 (e.g., the display 160 of FIG. 1) may include a panel 262, a hologram 264, or a projector 266. The panel 262 may be, for example, a Liquid Crystal Display (LCD), an Active Matrix Organic Light Emitting Diode (AM-OLED) display, or the like. The panel 262 may have a flexible, transparent or wearable form. The panel 262 may be formed of a single module with the touch panel 252. The hologram 264 may show a stereoscopic image in the air using the interference of light. The projector 266 may project an image onto a screen, which may be located internally or externally to the electronic device 201. According to an embodiment of the present invention, the display module 260 may further include a control circuit for controlling the panel 262, the hologram 264, and the projector 266.

The interface 270 may include, for example, a High-Definition Multimedia Interface (HDMI) 272, a Universal Serial Bus (USB) 274, an optical interface 276, or a D-sub-miniature (D-sub) connector 278. The interface 270 may be contained, for example, in the communication interface 170 shown in FIG. 1. Additionally or alternatively, the interface 270 may include, for example, a Mobile High-definition Link (MHL) interface, an SD memory card/Multi-Media Card (MMC) interface, or an Infrared Data Association (IrDA) interface.

The audio module 280 may perform a conversion between sounds and electrical signals. At least a part of the audio module 280 may be contained, for example, in the input and output interface 150 shown in FIG. 1. The audio module 280 may process sound information input or output through a speaker 282, a receiver 284, an earphone 286, or the microphone 288.

The camera module 291 is a device capable of obtaining still images and moving images. According to an embodiment of the present invention, the camera module 291 may include at least one image sensor (e.g., a front sensor or a rear sensor), a lens, an Image Signal Processor (ISP), or a flash (e.g., an LED or xenon lamp).

The power management module 295 may manage electrical power of the electronic device 201. The power management module 295 may include, for example, a Power Management Integrated Circuit (PMIC), a charger IC, or a battery gauge.

The PMIC may be formed, for example, of an IC or an SoC. Charging may be performed in a wired or wireless manner. The charger IC may charge a battery 296 and prevent overvoltage or overcurrent from a charger. According to an embodiment of the present invention, the charger IC may have a charger IC used for at least one of wired and wireless charging types. A wireless charging type may include, for example, a magnetic resonance type, a magnetic induction type, or an electromagnetic type. Any additional circuit for wireless charging may be further used such as a coil loop, a resonance circuit, or a rectifier.

The battery gauge may measure the residual amount of electrical power of the battery 296 and a voltage, current or temperature during a charging process. The battery 296 may store or generate electrical power therein and supply electrical power to the electronic device 201. The battery 296 may be, for example, a rechargeable battery or a solar battery.

The indicator 297 may show thereon a current status (e.g., a booting status, a message status, or a recharging status) of the electronic device 201 or of its parts (e.g., the AP 210). The motor 298 may convert an electrical signal into a mechanical vibration. The electronic device 201 may include a certain processor (e.g., a GPU) for supporting a mobile TV. This processor may process media data that comply with standards of Digital Multimedia Broadcasting (DMB), Digital Video Broadcasting (DVB), or media flow.

Each of the above-described elements of the electronic device 201 disclosed herein may be formed of one or more components, and its name may vary according to the type of the electronic device 201. The electronic device 201 disclosed herein may be formed of at least one of the above-discussed elements without some elements or with additional other elements. Some of the elements may be integrated into a single entity that performs the same functions as those of such elements before being integrated.

The term "module" used in the present invention may refer to a certain unit that includes one of hardware, software and firmware or any combination thereof. The term "module" may be interchangeably used with the terms "unit," "logic," "logical block," "component," or "circuit," for example. The term "module" may indicate a minimum unit, or part thereof, which performs one or more particular functions. The term "module" may indicate a device formed mechanically or electronically. For example, the term "module" disclosed herein may indicate an device that includes at least one of an Application-Specific Integrated Circuit (ASIC), a Field-Programmable Gate Array (FPGA), and a programmable-logic device, which are known or will be developed.

Figure 3:
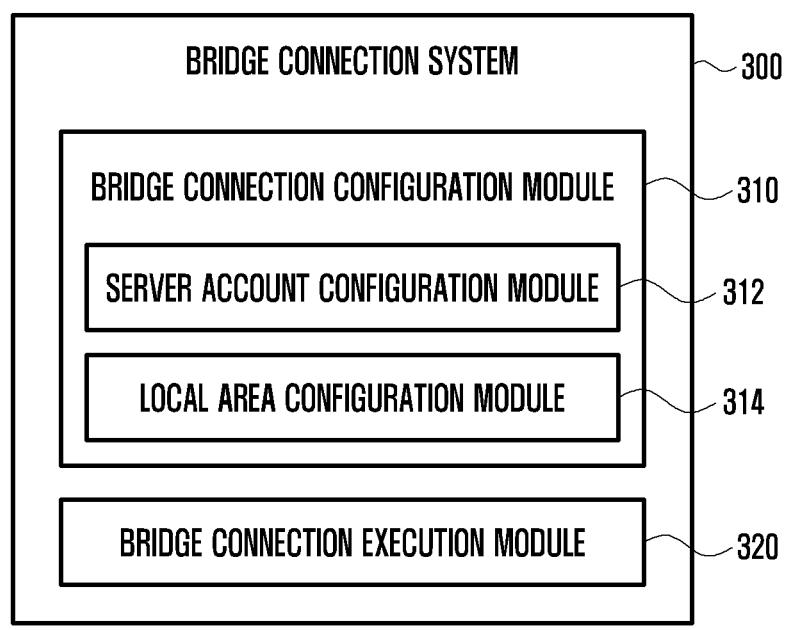
FIG. 3 is a block diagram of a bridge connection system of an electronic device according to an embodiment of the present invention.

FIG. 3 is a block diagram of a bridge connection system of an electronic device according to an embodiment of the present invention.

Referring to FIG. 3, the bridge connection system 300 may include a bridge connection configuration module 310 and a bridge connection execution module 320. In this case, the bridge connection system 300 may refer to a system capable of transmitting an event generated from a certain terminal to a bridge connection device through a third device. That is, the third device acts as a bridge for transferring the event from the certain terminal to the bridge connection device. The bridge connection device may receive the event generated from the certain terminal using (or through) the third device.

According to an embodiment of the present invention, the electronic device 102 (e.g. a wearable device) may transmit and receive data related to an event generated from a main device (e.g., the electronic device 101) using the bridge connection system 300 and a connection to a previously registered sub-device (e.g., the electronic device 104), even though a pairing through a wireless connection (e.g., Bluetooth) between the electronic device 102 and the main device (e.g., the electronic device 101) is disconnected. Therefore, the electronic device 102 may pass a limited communication method (e.g., Bluetooth) of a device through the bridge connection system, and improve the utilization of the electronic device 102, such as a wearable device using a wireless communication (e.g., Bluetooth), as the primary means of communication with the electronic device 101.

According to an embodiment of the present invention, in the above example, the electronic device 102, which transmits and receives, to and from the sub-device (e.g., the electronic device 104), a random event (e.g. a communication event) generated from the main device (e.g., the electronic device 101) using the bridge connection system 300, may be referred to as the bridge connection device. In addition, the electronic device 101, 102 or 104 are not limited to the above example (e.g., the main device, the sub-device or the bridge connection device), and may perform the bridge connection system 300 by always changing a corresponding role according to a configuration of the bridge connection system 300.

Referring to FIG. 3, the bridge connection configuration module 310 may include a server account configuration module 312 and a local area configuration module 314.

According to an embodiment of the present invention, when the bridge connection system 300 uses a server, the server account configuration module 312 may manage an account of the server managing the bridge connection system 300. The server account configuration module 312 may register the main device and the sub-device correspondingly to a random account. The server account configuration module 312 may configure one main device representing the random account. The server account configuration module 312 may include at least one of various pieces of information (e.g., a Media Access Control (MAC) address, an Internet Protocol (IP) address, account information or the like) of the sub-device necessary for a wireless connection and may register at least one of the various pieces of the information as a low rank concept. In addition, the server account configuration module 312 may change a configuration related to a previously registered main device or sub-device to configure the main device as the sub-device and the sub-device as the main device. In addition, the server account configuration module 312 may delete the previously registered main device or sub-device, or exclude a device required to be excluded from the bridge connection system 300, by inputting information on the device (e.g., NFC tagging, device recognition through photographing, information input by a user, and the like). That is, the server account configuration module 312 may store and manage a list of devices registered in the account of the server and various pieces of information concerning each device.

According to an embodiment of the present invention, the server account configuration module 312 may receive approvals of each electronic device using an additional authentication procedure in a process of registering the main device and the sub-device in the account of the server. Thus, the bridge connection system 300 may be configured to only register a device that is approved by a user in the account. In addition, the server account configuration module 312 may select a device to register the selected device in the account. The server account configuration module 312 may store information (e.g., the MAC address, the IP address, the account information, or the like) on a random device as a "black list," and configure a device in the black list such that the device cannot be registered.

According to an embodiment of the present invention, the bridge connection device may be any sub-device of at least one sub-device that has been previously registered in the bridge connection system 300. For example, in a case in which a first sub-device is connected to a second sub-device, and the first and second sub-devices are not connected to the main device, when an event of the main device is transmitted to the first sub-device, the first sub-device may be operated as the bridge connection device and the second sub-device may be operated as the sub-device. In this case, a situation in which the main device or the server should select a device to which the event is transmitted may be generated. Thus, the server account configuration module 312 may configure a priority between sub-devices. Through this, even though different sub-devices are connected, a certain sub-device may be operated as the bridge connection device and another sub-device may be operated as the sub-device, based on the previously configured priority.

According to an embodiment of the present invention, the server account configuration module 312 may configure the priority of at least one sub-device based on at least one of the speed of Internet network in which the sub-device is included and the performance of the sub-device. That is, since the data related to the random event may be more effectively transferred when the speed of the Internet network is fast or the performance of the sub-device is high, the priority may be configured to be high.

According to an embodiment of the present invention, the server account configuration module 312 may change the priority of the previously configured sub-devices. Since the speed of the Internet network may change continuously, the priority may also change continuously. Each sub-device that belongs to the bridge connection system 300 may transmit information concerning the speed of the Internet network in which each sub-device is included to the server, and the sub-device may receive feedback for the priority from the server. The server account configuration module 312 may change the priority of each sub-device based on the feedback.

According to an embodiment of the present invention, the local area configuration module 314 may configure the main device and the sub-device forming the bridge connection system 300 in a local area, when the bridge connection system 300 does not use the server. The local area configuration module 314 may configure a local area group forming the bridge connection system 300 using a bridge system configuration mode. The local area configuration module 314 may configure one main device representing a random group. The local area configuration module 314 may include at least one of various pieces of information (e.g., a MAC address, an IP address, account information or the like) of the sub-device necessary for a wireless connection and register at least one of the various pieces of the information as a low rank concept. In addition, the local area configuration module 314 may change the configuration related to a previously configured main device or sub-device in order to configure the main device as the sub-device and the sub-device as the main device. In addition, the local area configuration module 314 may delete the previously configured main device or sub-device to exclude the previously configured main device or sub-device from the bridge connection system 300. That is, the local area configuration module 314 may store and manage a list of devices included in the local group and various pieces of information on each device.

According to an embodiment of the present invention, the local area configuration module 314 may receive approvals of each electronic device using an additional authentication procedure in a process of registering the main device and the sub-device in the local area group. Thus, the bridge connection system 300 may be configured to only include devices that are approved by a user in a group. In addition, the local area configuration module 314 may select a device to be included in the group. The local area configuration module 314 may store information (e.g., the MAC address, the IP address, the account information, or the like) on a random device as a black list, and configure the device in the black list such that the device cannot be registered.

According to an embodiment of the present invention, the bridge connection device may be a random sub-device of at least one sub-device which is previously registered in the bridge connection system 300. For example, in a case in which a first sub-device is connected to a second sub-device, and the first and second sub-devices are not connected to the main device, when an event of the main device is transmitted to the first sub-device, the first sub-device may be operated as the bridge connection device and the second sub-device may be operated as the sub-device. In this case, a situation may be generated in which the main device or the server should select a device to which the event is transmitted. Thus, the local area configuration module 314 may configure a priority between sub-devices. In this case, even though different sub-devices are connected, a certain sub-device may be operated as the bridge connection device and another sub-device may be operated as the sub-device, based on a previously configured priority.

According to an embodiment of the present invention, the local area configuration module 314 may configure the priority of at least one sub-device based on at least one of the speed of the Internet network in which the sub-device is included and the performance of the sub-device. That is, since data related to a random event may be more effectively transferred when the speed of the Internet network is fast or the performance of the sub-device is high, the priority may be configured high.

According to an embodiment of the present invention, the local area configuration module 314 may change the priority of previously configured sub-devices. Since the speed of the Internet network may change continuously, the priority may also change continuously. Each sub-device that belongs to the bridge connection system 300 may transmit information concerning the speed of Internet network in which each sub-device is included to the server, and the sub-device may receive feedback for the priority from the server. The local area configuration module 314 may change the priority of each sub-device based on the feedback.

According to an embodiment of the present invention, the bridge connection execution module 320 may execute a bridge connection function based on contents configured in the bridge connection configuration module 310.

The bridge connection execution module 320 may determine whether a bridge connection mode of each electronic device forming the bridge connection system 300 is activated. In addition, the bridge connection execution module 320 may determine whether the bridge connection device is connected to the sub-device. Therefore, when a random event (e.g., a call, a message transmission and the like) is generated in the main device, the random event generated in the main device is transferred to the bridge connection device using the activated sub-device, and thus the bridge connection may be executed.

According to an embodiment of the present invention, the bridge connection execution module 320 may execute a certain function by limiting the certain function to a sub-device registered in the bridge connection system 300. For example, the sub-device's security may be vulnerable and thus it may be inappropriate to use the sub-device as a route for transferring important information. In this case, a leakage of information may be prevented by transferring some of the important information. In addition, a case in which the performance (e.g., the performance of the Internet network to which the main device or the sub-device is connected or the performance of the main device or the sub-device) of at least one of the main device and the sub-device is low and thus a function to be executed by a user may be generated that cannot be smoothly transferred.

In an embodiment of the present invention, when the speed of the Internet network of at least one of the main device and the sub-device is reduced to a speed below a predetermined speed, a user of the electronic device 101 or the electronic device 201 may play music using a bridge connection mode. In this case, the bridge connection execution module 320 may stop the playing of music, and output at least one of a message, a sound and a vibration, which indicates that a bridge connection function is limited since the Internet environment is not stable.

According to an embodiment of the present invention, the bridge connection execution module 320 may change while transmitting data related to the random event corresponding to the priority of the sub-device registered in the bridge connection system 300.

In an embodiment of the present invention, when the bridge connection device (e.g., a wearable device) receives a stream of music from a first sub-device, the bridge connection device may detect a second sub-device as the distance between the bridge connection device and the second sub-device, of which the priority is higher than that of the first sub-device, becomes shorter than the distance between the bridge connection device and the first sub-device. In this case, the bridge connection execution module 320 may propose a change of the sub-device to a user of the bridge connection device. When the user of the bridge connection device accepts the proposal, the sub-device may be changed to the second sub-device, and the server or the main device (in a case in which the server is not used) may stop transmitting data to the first sub-device and transmit the data to the second sub-device.

Figure 4:
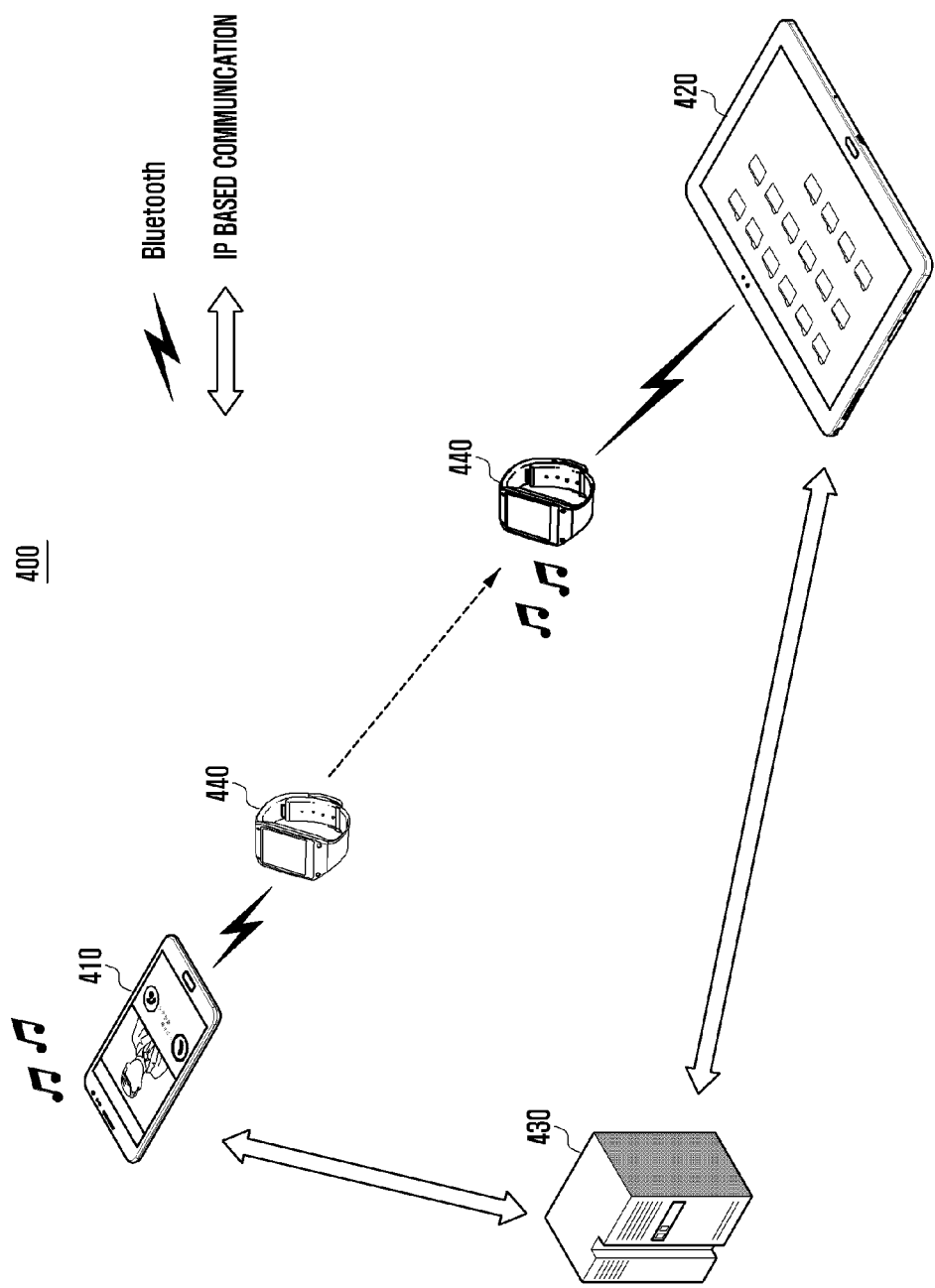
FIG. 4 is a diagram of a bridge connection system of an electronic device according to an embodiment of the present invention.

FIG. 4 is a diagram of a bridge connection system of an electronic device according to an embodiment of the present invention.

Referring to FIG. 4, according to an embodiment of the present invention, the bridge connection system 400 may include a main device 410, a sub-device 420, a server 430, a bridge connection device 440. In addition, in the bridge connection system 400, the server 430 may be omitted. In this case, the main device 410 and the sub-device 420 may exchange data related to the random event directly without passing through (or using) the server 430.

According to an embodiment of the present invention, when a connection between the bridge connection device 440 and the main device 410 is disconnected as a distance between the bridge connection device 440 and the main device 410 becomes longer, the bridge connection device 440 may be connected to the sub-device using previously stored connection information (e.g., MAC address) of the sub-device 420. In this case, the bridge connection device 440 may receive the MAC address of the sub-device 420 when the bridge connection device 440 is connected to the main device 410. Alternatively, the bridge connection device 440 may receive account information stored in the server 430 that uses a separate communication module.

According to an embodiment of the present invention, when the sub-device 420 is connected to the bridge connection device 440, the sub-device 420 may transmit information on whether the sub-device 420 is connected to the bridge connection device 440 to the server 430. In this case, the sub-device 420 may transmit an IP address of a currently connected Internet network to the server 430 together with the information. In addition, when the IP address of the connected Internet network is changed, the sub-device 420 may transmit the changed IP address of the changed Internet network to the server 430. Through this, when the data related to the random event is transmitted from the main device 410, the server 430 may transmit corresponding data to the sub-device 420 connected to the bridge connection device 440.

According to an embodiment of the present invention, when the connection between the main device 410 and the bridge connection device 440 is maintained, the main device 410 may directly transmit a random event generated from the main device 410 to the bridge connection device 440. In addition, when the connection between the main device 410 and the bridge connection device 440 is disconnected, the main device 410 may transmit the random event generated from the main device 410 to the server 430. When the data related to the random event is transmitted from the main device 410 to the server 430, the server 430 may transmit the corresponding data to the sub-device 420 connected to the bridge connection device 440.

According to an embodiment of the present invention, even through the connection between the main device 410 and the bridge connection device 440 is not disconnected, the main device 410 may intentionally change a task. That is, even though the main device 410 and the bridge connection device 440 are within a transmittable and receivable distance, and thus the connection between the main device 410 and the bridge connection device 440 is maintained, the main device 410 may intentionally change the task to transmit or receive the data related to the data to or from at least one of the server 430 and the sub-device 420.

According to an embodiment of the present invention, when the main device 410 intentionally changes the task, the main device 410 may define a previously executed event, and transmit the defined event to the bridge connection device 440 using at least one of the server 430 and the sub-device 420. For example, when the main device 410 tries to change music that is currently played by the main device 410 and tries to transmit the music, the main device 410 may define the type and playing position of the music which is currently being executed, and transmit the defined type and position of the music to the bridge connection device 440 using at least one of the server 430 and the sub-device 420. In addition, when the main device 410 uses navigation, the main device 410 may define a previously configured destination or a current position, and transmit the defined destination and the current position to the bridge connection device 440 using at least one of the server 430 and the sub-device 420. In this case, even though the task is changed, the main device 410 may provide a previously provided event to a user of the bridge connection device 440 seamlessly.

According to an embodiment of the present invention, even though the main device 410 is not directly connected to the bridge connection device 440, the main device 410 may change the data related to the random event with the bridge connection device 440, which continuously uses the sub-device 420 to act as a bridge, through the bridge connection system 400. Of course, when the user does not activate a bridge connection function, the random event may be transferred to only the main device 410.

In addition, even in a case in which the bridge connection device 440 is connected to the sub-device 420, the bridge connection device 440 may consistently transmit a packet to the main device 410. When the main device 410 enters into an area within an accessible distance of the bridge connection device 440, the bridge connection device 440 may be disconnected from the sub-device, and connected to the main device 410 again. In this case, the main device 410 may not transmit the data related to the random event, generated from the main device 410, to the server 430, but may directly transmit the random event to the bridge connection device 440.

According to an embodiment of the present invention, the bridge connection device 440 may be operated based on an Embedded-Subscriber Identity Module (E-SIM). The E-SIM may refer to software such as firmware that is different from hardware which is physically shaped like a SIM. The E-SIM may store subscriber information including a telephone number and the like, in the same manner as a SIM. The user of the bridge connection device 440 may download an E-SIM corresponding to a SIM included in the main device 410 to the bridge connection device 440. Thus, the main device 410 and the bridge connection device 440 may have the same subscriber identification number. However, when the bridge connection device 440 does not include the cellular module 221, even though the bridge connection device 440 has the subscriber identification number, it may be difficult for the bridge connection device 440 to independently receive various communication events such as a call event. In this case, the bridge connection device 440 may receive a forwarded call using the sub-device 420. When the bridge connection device 440 is connected to the sub-device 420, the bridge connection device 440 may transmit the subscriber information in the E-SIM to the sub-device 420. Thus, the sub-device 420 may receive various communication events such as a call event from a base station using the subscriber information of the E-SIM, and transmit the communication event to the connected bridge connection device 400. Therefore, even though the user of the bridge connection device 440 does not have the main device 410, the user of the bridge connection device 440 may continuously receive the communication event by downloading the E-SIM.

According to an embodiment of the present invention, when the bridge connection device 440 identifies an arrival of an event, the bridge connection device 440 may not receive the event and may forward the event to the main device 410 or the sub-device 420. This is because a case may be generated in which the receiving of the event by the main device 410 or the sub-device 420 rather than the bridge connection device 440 is more convenient, depending on where the user is located. For example, when the bridge connection device 440 identifies the transferring of the communication event (e.g., a call) from a Head Mounted Terminal (HMT) or a Head Mounted Display (HMD), the user may not receive the communication event using the bridge connection device 440 and may transfer the communication event to the HMT or the HMD. In this case, a User Interface (UI) for asking whether the HMT or the HMD receives the communication event transferred from the bridge connection device 440 may be displayed in the HMT or the HMD.

An electronic device according to an embodiment of the present invention may include a cellular communication module; a first short range wireless communication module; a second short range wireless communication module; a processor that is electrically connected to the cellular communication module, the first short range wireless communication module and the second short range wireless communication module; and a memory. The processor may detect a generation of an event based on at least one of a signal received externally and an internal operation; determine a state of a connection between the electronic device and a first external electronic device that has been connected to the electronic device using the first short range wireless communication module; and transmit a signal related to the event, using at least one of the cellular communication module, the first short range wireless communication module, and the second short range wireless communication module, based on at least some of the state of the connection between the electronic device and a first external electronic device.

The method may further include transmitting the signal related to the event, to a second external electronic device, using at least one of the cellular communication module and the second short range wireless communication module, when the electronic device is not connected to the first external electronic device.

The first external electronic device may include a wearable device, and the second external electronic device may include a server.

The first external electronic device may include a wearable device, and the second external electronic device may include another electronic device.

The method may further comprise transmitting the signal related to the event to a second external electronic device using at least one of the cellular communication module and the second short range wireless communication module, when the electronic device is not connected to the first external electronic device, and the signal related to the event may be configured to be transferred from the second external electronic device to the first external electronic device.

The first external electronic device may include a wearable device, and the second external electronic device may include a server.

The first external electronic device may include a wearable device, and the second external electronic device may include another electronic device.

The signal related to the event may be configured to be transferred from the second external electronic device to the first external electronic device through the third external electronic device.

The first external electronic device may include a wearable device, the second external electronic device may include a server, and the third external electronic device may include another electronic device.

The method may further include determining whether an alarm, which indicates that the second external electronic device is connected to the first external electronic device, is received from the second external electronic device; and when the alarm is received from the second external electronic device, transmitting the signal related to the event to the second external electronic device.

The case in which the electronic device is not connected to the first external electronic device may include at least one of a case in which a distance between the electronic device and the first external electronic device is greater than a transmittable and receivable distance and thus the connection between the electronic device and the first external electronic device is disconnected, and a case in which the electronic device disconnects the connection between the electronic device and the first external electronic device.

The event may include at least one of playing music, navigation execution, a call request, Short Message Service (SMS) execution, and Multimedia Message Service (MMS) execution.

The short range wireless communication module may include at least one of a Radio Frequency IDentification (RFID) protocol, a ZigBee protocol, an Infrared Data Association (IrDA) protocol and an Ultra WideBand (UWB) protocol.

An electronic device according to an embodiment of the present invention may include a first wireless communication module; a second wireless communication module; a processor that is electrically connected to the first wireless communication module and the second wireless communication module; and a memory. The processor may detect a generation of an event based on at least one of a signal received externally and an internal operation; determine whether the electronic device is connected to a first external electronic device that has been connected to the electronic device using the first wireless communication module; and transfer information on whether the event is generated and a signal related to the event to the first external electronic device, using the second wireless communication module, when the connection is disconnected.

An electronic device according to an embodiment of the present invention may include a first short range wireless communication module; a second short range wireless communication module; a processor that is electrically connected to the first short range wireless communication module and the second short range wireless communication module; and a memory. The processor may determine a state of a connection between the wearable electronic device and a first external electronic device that has been connected to the wearable electronic device using the first short range wireless communication module; and receive, from a second external electronic device, a signal related to an event generated in the first external electronic device, using at least one of the first short range wireless communication module and the second short range wireless communication module, based on at least some of the state of the connection.

An electronic device according to an embodiment of the present invention may include a short range wireless communication module; a processor electrically connected to the short range wireless communication module; and a memory. The processor may connect the electronic device to a first external electronic device using the short range wireless communication module; transmit information on whether the electronic device is connected to the first external electronic device to a second external electronic device, when the electronic device is connected to the first external electronic device; receive a signal related to an event based on at least one of a signal received externally of the second external electronic device and an internal operation, from the second external electronic device; and transmitting the signal related to the event to the first external electronic device.

The first external electronic device may include a wearable device.

Figure 5:
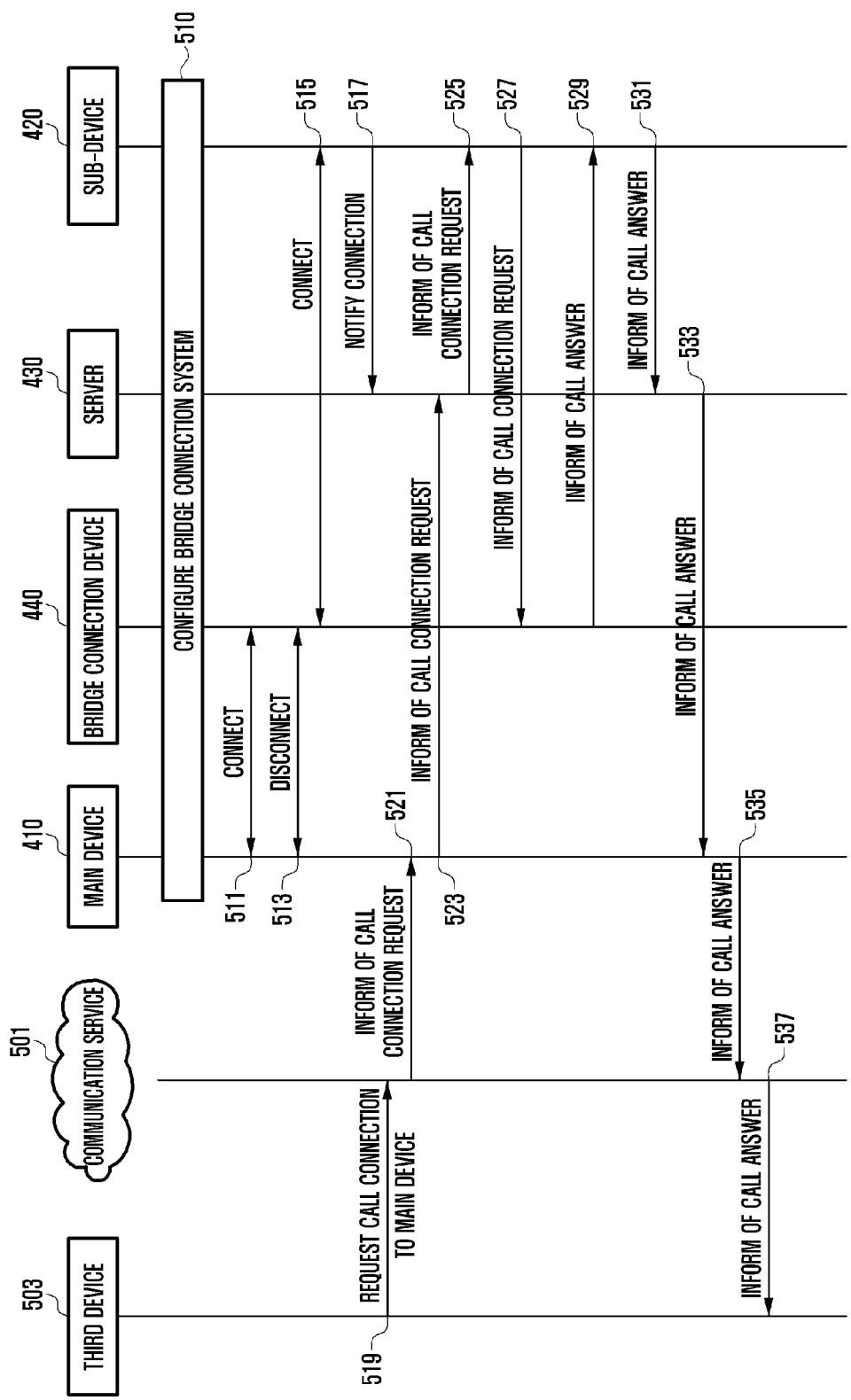
FIG. 5 is a signal flow diagram of a method of transmitting and receiving a random event of an electronic device according to an embodiment of the present invention that uses a server.

FIG. 5 is a signal flow diagram of a method of transmitting and receiving a random event of an electronic device according to an embodiment of the present invention that uses a server. In the description below, a call event among the random events is described as an example. In addition, a wearable device which uses a wireless connection (e.g., Bluetooth) connected to a certain terminal as the primary means of communication is described as an example of the bridge connection device 440.

Referring to FIG. 5, according to the method of transmitting and receiving the random event of the present invention, in step 510, the main device 410, the sub-device 420, the server 430, and the bridge connection device 440 may form the bridge connection system 300 or 400 using the bridge connection configuration module 310. In this case, the main device 410, the sub-device 420, the server 430 and the bridge connection device 440 may register at least one of each piece of the connection information (e.g., a MAC address and an IP address) in one account to form the bridge connection system 300 or 400.

According to an embodiment of the present invention, in step 511, the main device 410 and the bridge connection device 440 may be placed within a transmittable and receivable distance and thus the main device 410 and the bridge connection device 440 may be connected with each other. In this case, the bridge connection device 440 may receive information on the main device 410 and the sub-device 420 in the bridge connection system 300 or 400. For example, the bridge connection device 440 may receive the connection information (e.g., a MAC address) of the main device 410 and the sub-device 420, may store the connection information (e.g., a MAC address) of the main device 410 and the sub-device 420 in the memory 230, and may use the connection information (e.g., a MAC address) of the main device 410 and the sub-device 420 in a connection to each device.

According to an embodiment of the present invention, in step 513, when the distance between the main device 410 and the bridge connection device 440 is greater than the transmittable and receivable distance, the connection may be disconnected. In this case, the main device 410 may not directly transmit the data to the bridge connection device 440. Thus, the main device 410 may transmit the data to the bridge connection device 440 using the bridge (i.e., the sub-device 420).

According to an embodiment of the present invention, in step 515, the bridge connection device 440 may be connected to the random sub-device 420 using the information (e.g., a MAC address) of the sub-device, which has been previously stored in the memory 230.

According to an embodiment of the present invention, in step 517, the sub-device 420 may transmit information on the connection between the sub-device 420 and the bridge connection device 440 to the server 430. In this case, the sub-device 420 may transmit the IP address of the currently connected Internet network to the server 430. In addition, when the IP address of the currently connected Internet network is changed, the sub-device 420 may transmit the changed IP address to the server 430.

According to an embodiment of the present invention, in step 519, a third electronic device 503 may request a call connection with the main device 410 to the communication service 501 (or network 162 of FIG. 1).

According to an embodiment of the present invention, in step 521, the communication service 501 (or network 162 of FIG. 1) may transmit a notification related to the call connection request to the main device 410. In this case, the communication service 501 (or network 162 of FIG. 1) may search for a base station in which the main device 410 is located, and transmit, to the main device 410, the notification related to the call connection request to a corresponding base station.

According to an embodiment of the present invention, in step 523, the main device 410 receiving the notification related to the call connection request may transmit the notification related to the call connection request to the server 430. Of course, when the connection between the main device 410 and the bridge connection device 440 is maintained, the main device 410 may directly transmit the notification related to the call connection request to the bridge connection device 440.

According to an embodiment of the present invention, in step 525, the server 430 receiving the notification related to the call connection request may transmit the notification related to the call connection request to the sub-device 420. In this case, the server 430 may transmit the notification related to the call connection request to the sub-device 420 using the IP address received in step 517.

According to an embodiment of the present invention, in step 527, the sub-device 420 may transmit the notification related to the call connection request to the bridge connection device 440.

According to an embodiment of the present invention, in step 529, the bridge connection device 440 may transmit a notification related to whether a call is answered to the sub-device 420. For example, the bridge connection device 440 may answer the call connection request of the third electronic device 503 and transmit a call answer notification to the sub-device 420.

According to an embodiment of the present invention, in step 531, the sub-device 420 may transmit the call answer notification to the server 430.

According to an embodiment of the present invention, in step 533, the server 430 may transmit the call answer notification received from the sub-device 420 to the main device 410.

According to an embodiment of the present invention, in step 535, the main device 410 may transmit the call answer notification to the communication service 501 (or network 162 of FIG. 1).

According to an embodiment of the present invention, in step 537, the communication service 501 may transmit information indicating that the user of the main device 410 answered the call to the third electronic device 503. Then, the communication service 501 may transmit and receive data so as to continuously perform a call function by forming a call channel with the third electronic device 503 and the main device 410.

Figure 6:
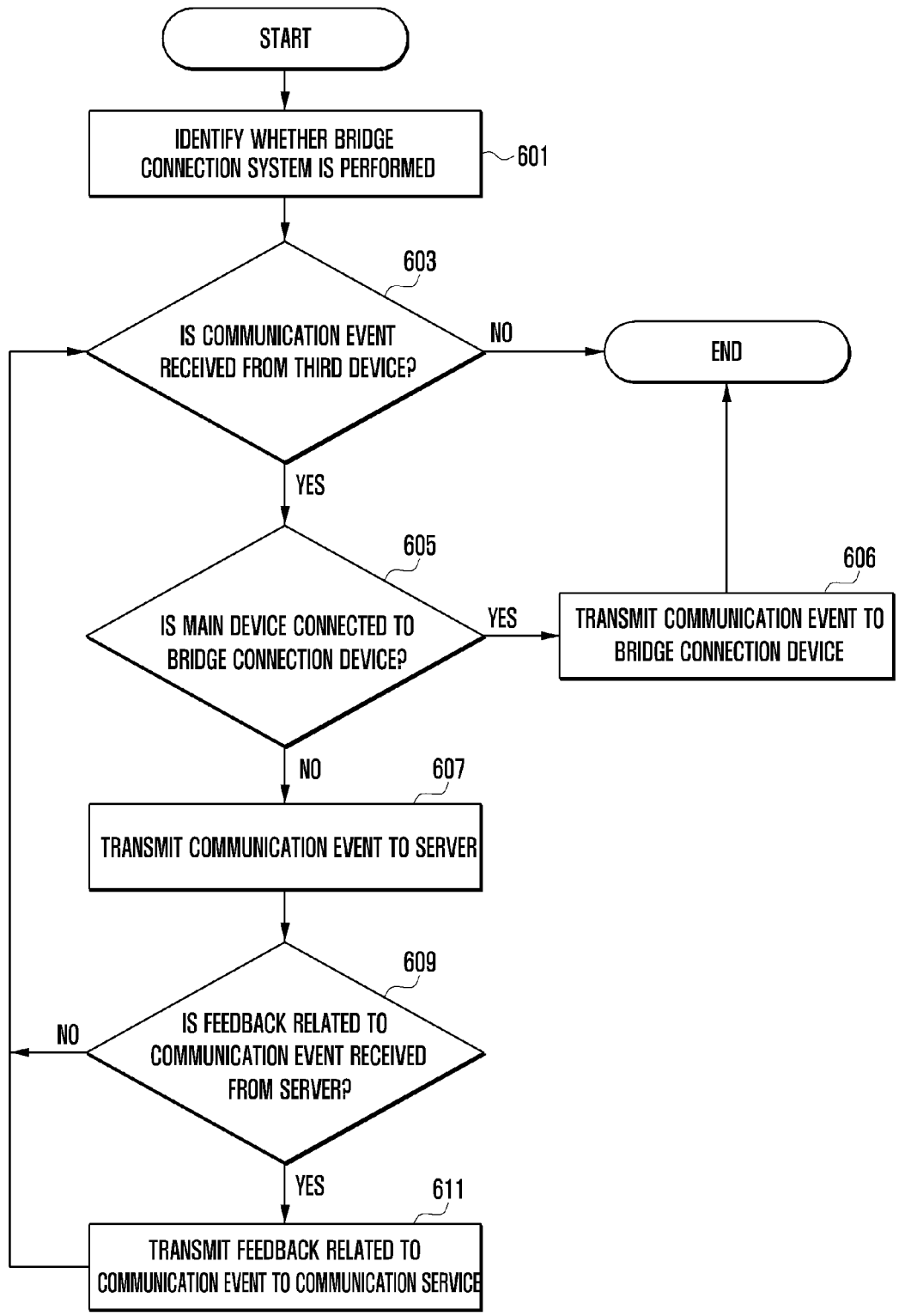
FIG. 6 is a flowchart of a method of transmitting and receiving a random event of a main device according to an embodiment of the present invention that uses a server.

FIG. 6 is a flowchart of a method of transmitting and receiving a random event of a main device according to an embodiment of the present invention that uses a server.

Referring to FIG. 6, according to an embodiment of the present invention, in step 601, the main device 410 may identify whether the bridge connection system is performed. In the bridge connection system 300 or 400, the main device 410, the sub-device 420, the server 430 and the bridge connection device 440 are included in one account, and the main device 410 may perform the bridge connection function using the bridge connection system 300 or 400. In addition, the main device 410, the sub-device 420, the server 430 and the bridge connection device 440 may register each MAC address or each IP address in one account to form the bridge connection system 300 or 400.

According to an embodiment of the present invention, in step 603, the main device 410 may determine whether the main device 410 receives a random event (e.g. a communication event) which is received by the third electronic device 503, from the communication service 501 (or the network 162 of FIG. 1).

According to an embodiment of the present invention, in step 603, when the main device 410 receives the random event, which is requested by the third electronic device 503, from the communication service 501 (or the network 162 of FIG. 1), the main device 410 may perform step 605 to determine whether the main device 410 is connected to the bridge connection device 440. Otherwise the method terminates.

According to an embodiment of the present invention, in step 605, when the main device 410 is connected to the bridge connection device 440, the main device 410 may perform step 606 to transmit the data related to the random event to the bridge connection device 440. Then, the method terminates.

According to an embodiment of the present invention, in step 605, when the main device 410 is not connected to the bridge connection device 440, the main device 410 may perform step 607 to transmit the data related to the random event to the server 430.

According to an embodiment of the present invention, in step 609, the main device 410 may determine whether the main device 410 receives feedback related to the random event from the server 430.

According to an embodiment of the present invention, in step 609, when the main device 410 does not receive the feedback related to the random event from the server 430, the main device 410 may perform step 603 to determine whether the main device 410 additionally receives the random event.

According to an embodiment of the present invention, in step 609, when the main device 410 receives the feedback related to the random event from the server 430, the main device 410 may perform step 611 to transmit the feedback related to the random event using the communication service 501 (or the network 162 of FIG. 1). Then, the main device 410 may perform step 603 to determine whether the main device 410 additionally receives the random event.

Figure 7:
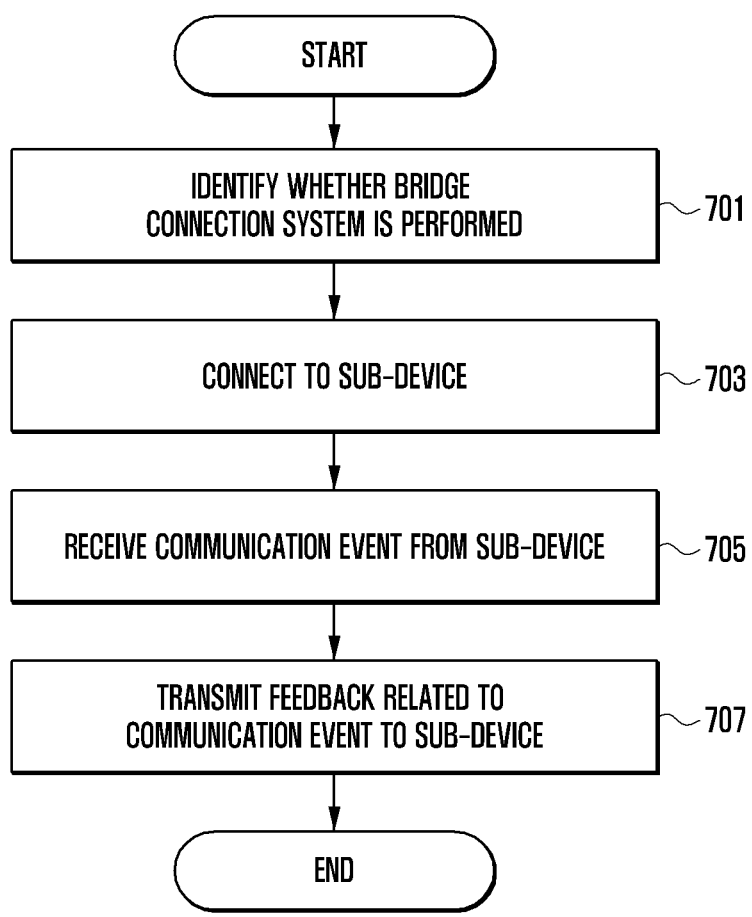
FIG. 7 is a flowchart of a method of transmitting and receiving a random event of a bridge connection device according to an embodiment of the present invention that uses a server.

FIG. 7 is a flowchart of a method of transmitting and receiving a random event of a bridge connection device according to an embodiment of the present invention that uses a server.

Referring to FIG. 7, according to an embodiment of the present invention, in step 701, the bridge connection device 440 may identify whether the bridge connection system is performed. In the bridge connection system 300 or 400, the main device 410, the sub-device 420, the server 430 and the bridge connection device 440 are included in one account, and the bridge connection device 440 may perform the bridge connection function using the bridge connection system 300 or 400. For example, the bridge connection device 440 may receive MAC addresses of the main device 410 and the sub-device 420, store the MAC addresses of the main device 410 and the sub-device 420, and use the MAC addresses of the main device 410 and the sub-device 420 in the connection to each device. In addition, the bridge connection device 440 may receive the MAC addresses of the main device 410 and the sub-device 420, store the MAC addresses of the main device 410 and the sub-device 420, and use the MAC addresses of the main device 410 and the sub-device 420 in the connection to each device.

According to an embodiment of the present invention, in step 703, the bridge connection device 440 may be connected to the sub-device 420 using the MAC address of the sub-device 420, which is previously stored in the memory 230.

According to a embodiment of the present invention, in step 705, the bridge connection device 440 may receive, from the sub-device 420, the data related to the random event generated from the third electronic device 503. For example, the bridge connection device 440 may receive the notification related to a call connection request from the sub-device 420.

According to an embodiment of the present invention, in step 707, the bridge connection device 440 may transmit the feedback related to the random event generated from the third electronic device 503 to the sub-device 420. For example, the bridge connection device 440 may transmit a notification of an answer of the call connection request to the sub-device 420.

Figure 8:
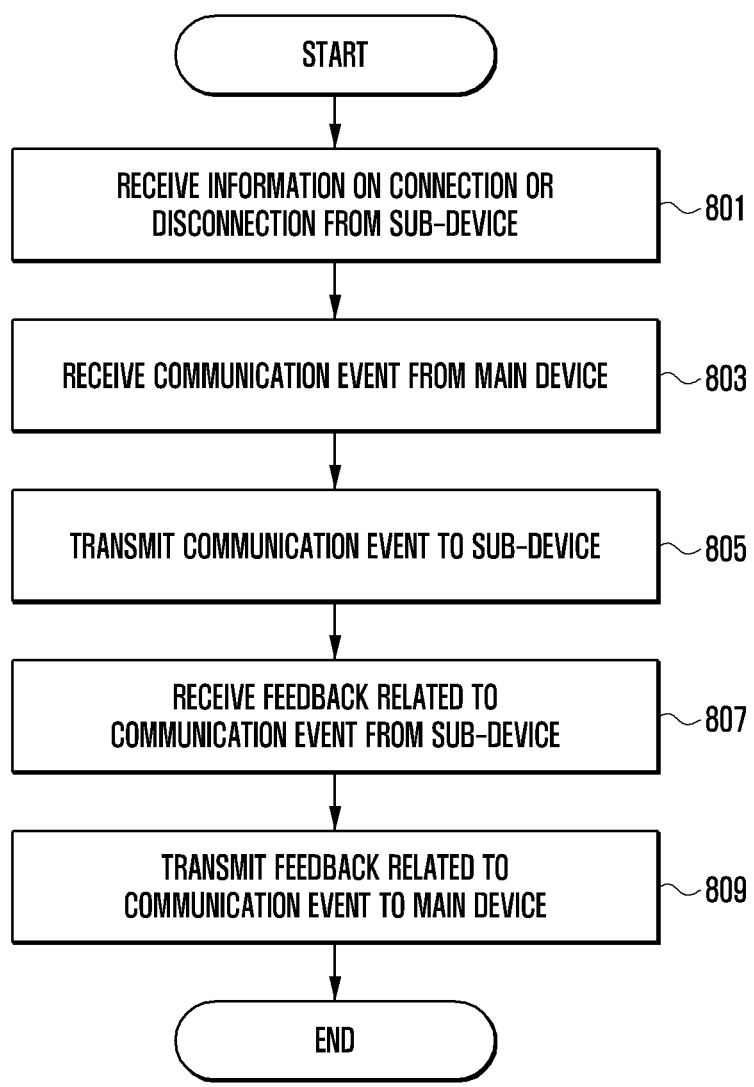
FIG. 8 is a flowchart of a method of transmitting and receiving a random event of a server according to an embodiment of the present invention that uses a server.

FIG. 8 is a flowchart of a method of transmitting and receiving a random event of a server according to an embodiment of the present invention that uses a server.

According to an embodiment of the present invention, the server 430 may form the bridge connection system 300 or 400 including the sub-device 420 and the bridge connection device 440. The server 430 may register each MAC address or each IP address in one account to update information of each device included in the bridge connection system 300 or 400.

Referring to FIG. 8, according to an embodiment of the present invention, in step 801, the server 430 may receive information on whether the sub-device 420 is connected to the bridge connection device 440 from the sub-device 420. In this case, the server 430 may receive the IP address of the sub-device 420. In addition, when the IP address of the sub-device 420 is changed, the server 430 may receive the changed IP address.

According to an embodiment of the present invention, in step 803, the server 430 may receive, from the main device 410, data related to the random event (e.g. a communication event) generated from the third electronic device 503.

According to an embodiment of the present invention, in step 805, the server 430 may transmit, to the sub-device 420, the data related to the random event received from the main device 410.

According to an embodiment of the present invention, in step 807, the server 430 may receive the feedback related to the random event from the sub-device 420.

According to an embodiment of the present invention, in step 809, the server 430 may transmit, to the main device 410, the feedback related to the random event received from the sub-device 420.

Figure 9:
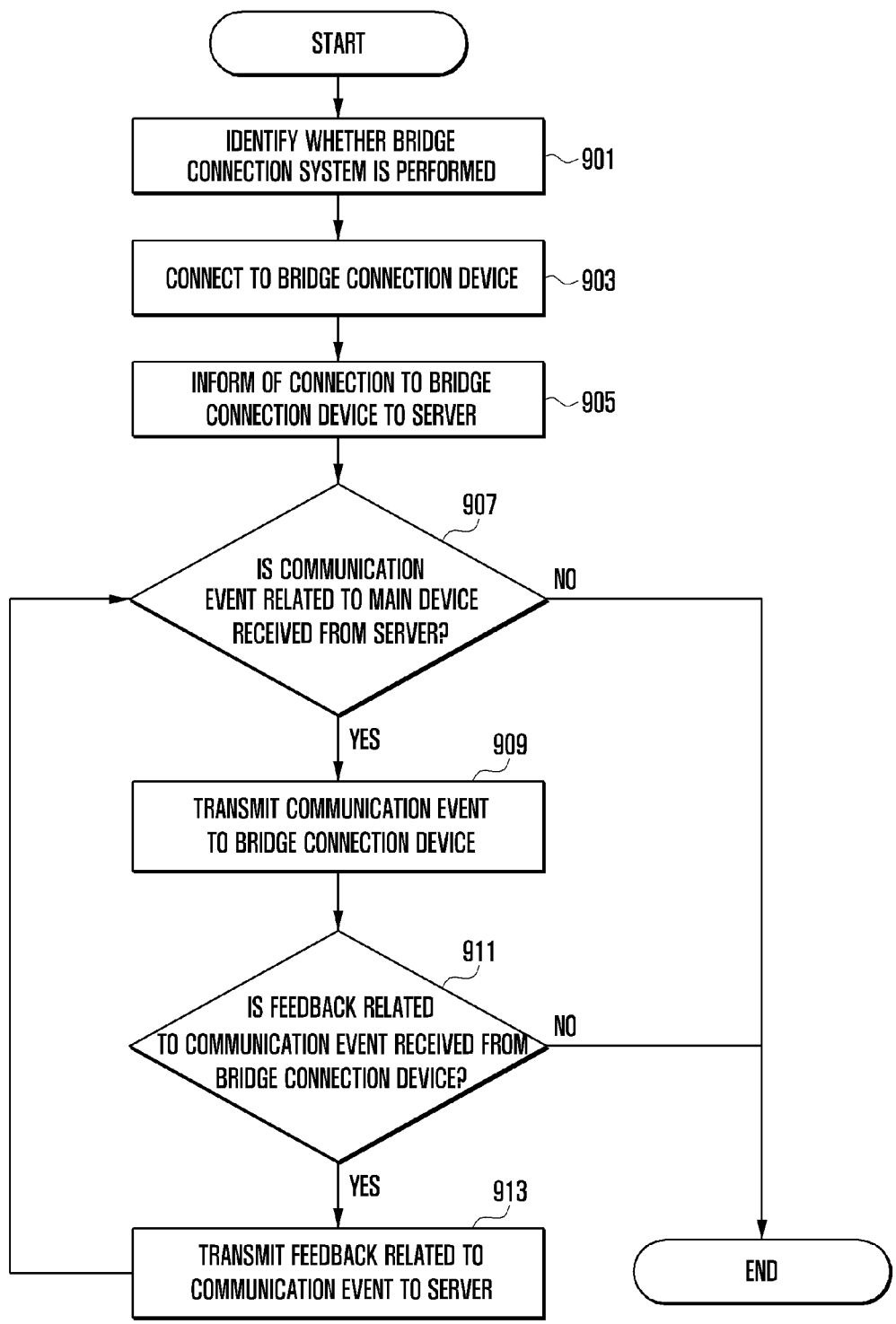
FIG. 9 is a flowchart of a method of transmitting and receiving a random event of a sub-device according to an embodiment of the present invention that uses a server.

FIG. 9 is a flowchart of a method of transmitting and receiving a random event (e.g. a communication event) of a sub-device according to an embodiment of the present invention that uses a server.

Referring to FIG. 9, according to an embodiment of the present invention, in step 901, the sub-device 420 may identify whether the bridge connection system is performed. In the bridge connection system 300 or 400, the main device 410, the sub-device 420, the server 430 and the bridge connection device 440 are included in one account, and the sub-device 420 may perform the bridge connection function using the bridge connection system 300 or 400. In addition, the main device 410, the sub-device 420, the server 430 and the bridge connection device 440 may register each MAC address or each IP address in one account to form the bridge connection system 300 or 400.

According to a embodiment of the present invention, in step 903, the sub-device 420 may be connected to the bridge connection device 440. The sub-device 420 may receive a connection request from the bridge connection device 440. When the sub-device 420 approves the connection request, the sub-device 420 may be connected to the bridge connection device 440. In a state in which the sub-device 420 is connected to the bridge connection device 440, the sub-device 420 may receive, from the server 430, the random event generated from the main device 410, and transfer the random event to the bridge connection device 440. That is, the sub-device 420 may act as a bridge between the main device 410 and the bridge connection device 440.

According to an embodiment of the present invention, in step 905, the sub-device 420 may transmit information on whether the sub-device 420 is connected to the bridge connection device 440 to the server 430.

According to an embodiment of the present invention, in step 907, the sub-device 420 may determine whether the sub-device 420 receives, from the server 430, the data related to the random event generated from the main device 410.

According to an embodiment of the present invention, in step 907, when the sub-device 420 receives, from the server 430, the data related to the random event, the sub-device 420 may perform step 909 to transmit the data related to the random event to the bridge connection device 440. Otherwise, the method terminates.

According to an embodiment of the present invention, in step 911, the sub-device 420 may determine whether the sub-device 420 receives the feedback related to the random event from the bridge connection device 440.

According to an embodiment of the present invention, in step 911, when the sub-device 420 receives the feedback related to the random event from the bridge connection device 440, the sub-device 420 may perform step 913 to transmit the feedback related to the random event to the server 430. Then, the sub-device 420 may perform step 907 to determine whether the sub-device 420 additionally receives the random event. Otherwise, the method terminates.

Figure 10:
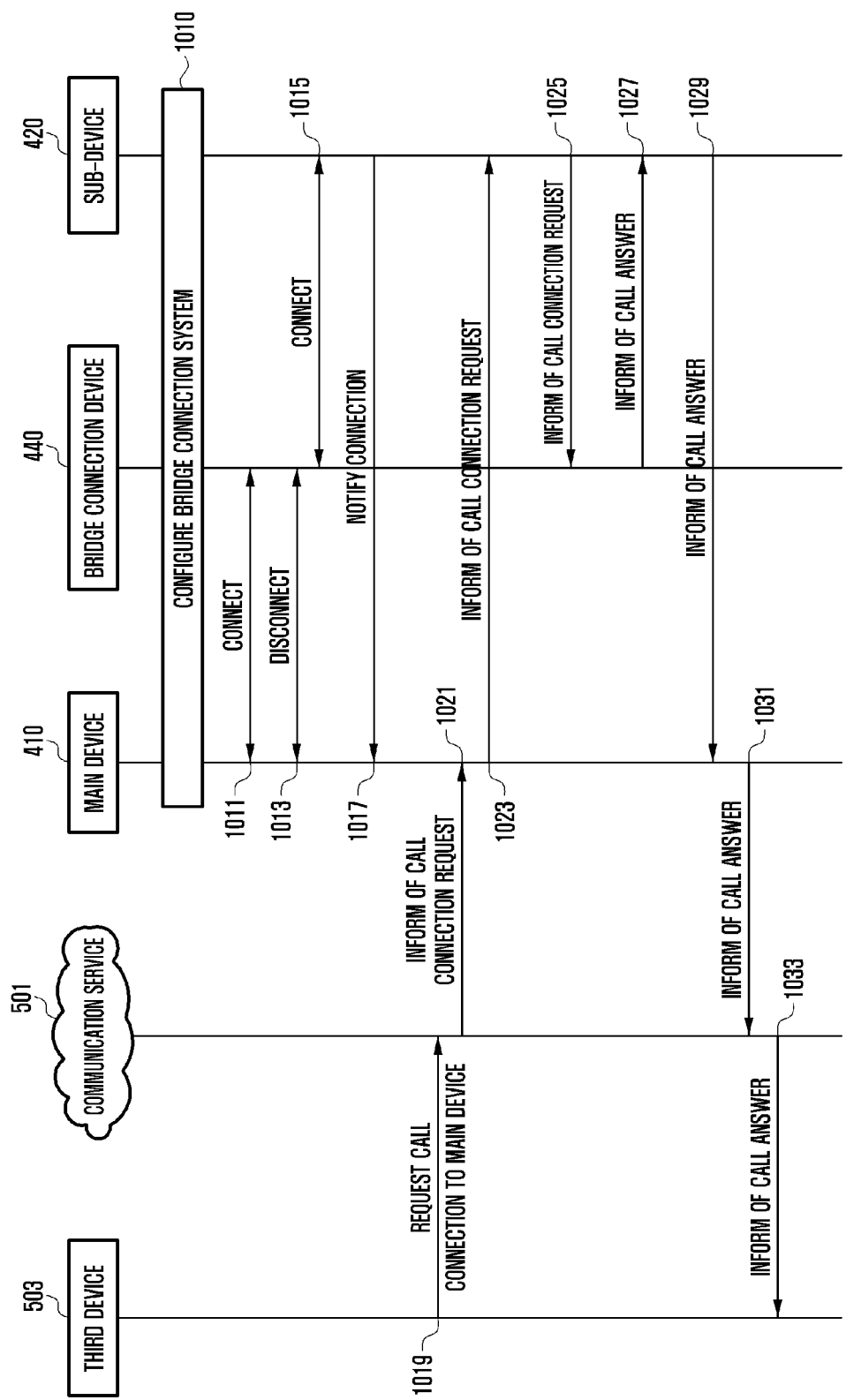
FIG. 10 is a signal flow diagram of a method of transmitting and receiving a random event of an electronic device according to an embodiment of the present invention that does not use a server.

FIG. 10 is a signal flow diagram of a method of transmitting and receiving a random event of an electronic device according to an embodiment of the present invention that does not use a server. In the description below, a call event among the random events is described as an example. In addition, a wearable device which uses a wireless connection (e.g., Bluetooth) connected to a certain terminal as a main communication means is described as an example of the bridge connection device 440.

Referring to FIG. 10, according to an embodiment of the present invention, in the method of transmitting and receiving the random event of the present invention, in step 1010, the main device 410, the sub-device 420, and the bridge connection device 440 may form the bridge connection system 300 using the bridge connection configuration module 310. In this case, the main device 410, the sub-device 420 and the bridge connection device 440 may register each MAC address or each IP address in one local group to form the bridge connection system 300.

According to an embodiment of the present invention, in step 1011, the main device 410 and the bridge connection device 440 may be placed within a transmittable and receivable distance and, thus, the main device 410 and the bridge connection device 440 may be connected with each other. In this case, the bridge connection device 440 may receive information on the main device 410 and the sub-device 420 in the bridge connection system 300. For example, the bridge connection device 440 may receive the MAC address of the main device 410 and the sub-device 420, store the MAC address of the main device 410 and the sub-device 420 in the memory 230, and may use the MAC address of the main device 410 and the sub-device 420 in a connection to each device.

According to an embodiment of the present invention, in step 1013, when the distance between the main device 410 and the bridge connection device 440 is greater than the transmittable and receivable distance, the connection may be disconnected. In this case, the main device 410 may not directly transmit the data to the wearable device 440. Thus, the main device 410 may transmit the data to the bridge connection device 440 using the bridge (i.e., the sub-device 420).

According to an embodiment of the present invention, in step 1015, the bridge connection device 440 may be connected to the random sub-device 420 using the MAC address of the sub-device, which is previously stored in the memory 230.

According to an embodiment of the present invention, in step 1017, the sub-device 420 may transmit information on the connection between the sub-device 420 and the bridge connection device 440 to the main device 410. In this case, the sub-device 420 may transmit the IP address of the currently connected Internet network to the main device 410. In addition, when the IP address of the currently connected Internet network is changed, the sub-device 420 may transmit the changed IP address to the main device 410.

According to an embodiment of the present invention, in step 1019, the third electronic device 503 may request a call connection with the main device 410 to the communication service 501 (or the network 162 of FIG. 1).

According to an embodiment of the present invention, in step 1021, the communication service 501 (or network 162 in FIG. 1) may transmit the notification related to the call connection request to the main device 410. In this case, the communication service 501 (or network 162 of FIG. 1) may search for the base station in which the main device is placed, and transmit, to the main device 410, the notification related to the call connection request to a corresponding base station.

According to an embodiment of the present invention, in step 1023, the main device 410 receiving the notification related to the call connection request may transmit the notification related to the call connection request to the sub-device 420. Of course, when the connection between the main device 410 and the bridge connection device 440 is maintained, the main device 410 may directly transmit the notification related to the call connection request to the bridge connection device 440. In addition, the description above with reference to FIG. 5 describes the case in which the server 430 is used. However, since the description above and below with reference to FIG. 10 describes the case in which the server 430 is not used, the main device 410 may directly transmit the notification related to the call connection request to the sub-device 420.

According to an embodiment of the present invention, in step 1025, the sub-device 420 may transmit the notification related to the call connection request to the bridge connection device 440.

According to an embodiment of the present invention, in step 1027, the bridge connection device 440 may transmit a notification related to whether a call is answered to the sub-device 420. For example, the bridge connection device 440 may answer the call connection request of the third electronic device 503 and may transmit a call answer notification to the sub-device 420.

According to an embodiment of the present invention, in step 1029, the sub-device 420 may directly transmit the call answer notification of the bridge connection device 440 to the main device 410.

According to an embodiment of the present invention, in step 1031, the main device 410 may transmit the call answer notification received from the sub-device 420 to the communication service 501.

According to an embodiment of the present invention, in step 1033, the communication service 501 may transmit information indicating that the user of the main device 410 answers the call to the third electronic device 503. Then, the communication service 501 may transmit and receive data so as to continuously perform the call function by forming the call channel with the third electronic device 503 and the main device 410.

Figure 11:
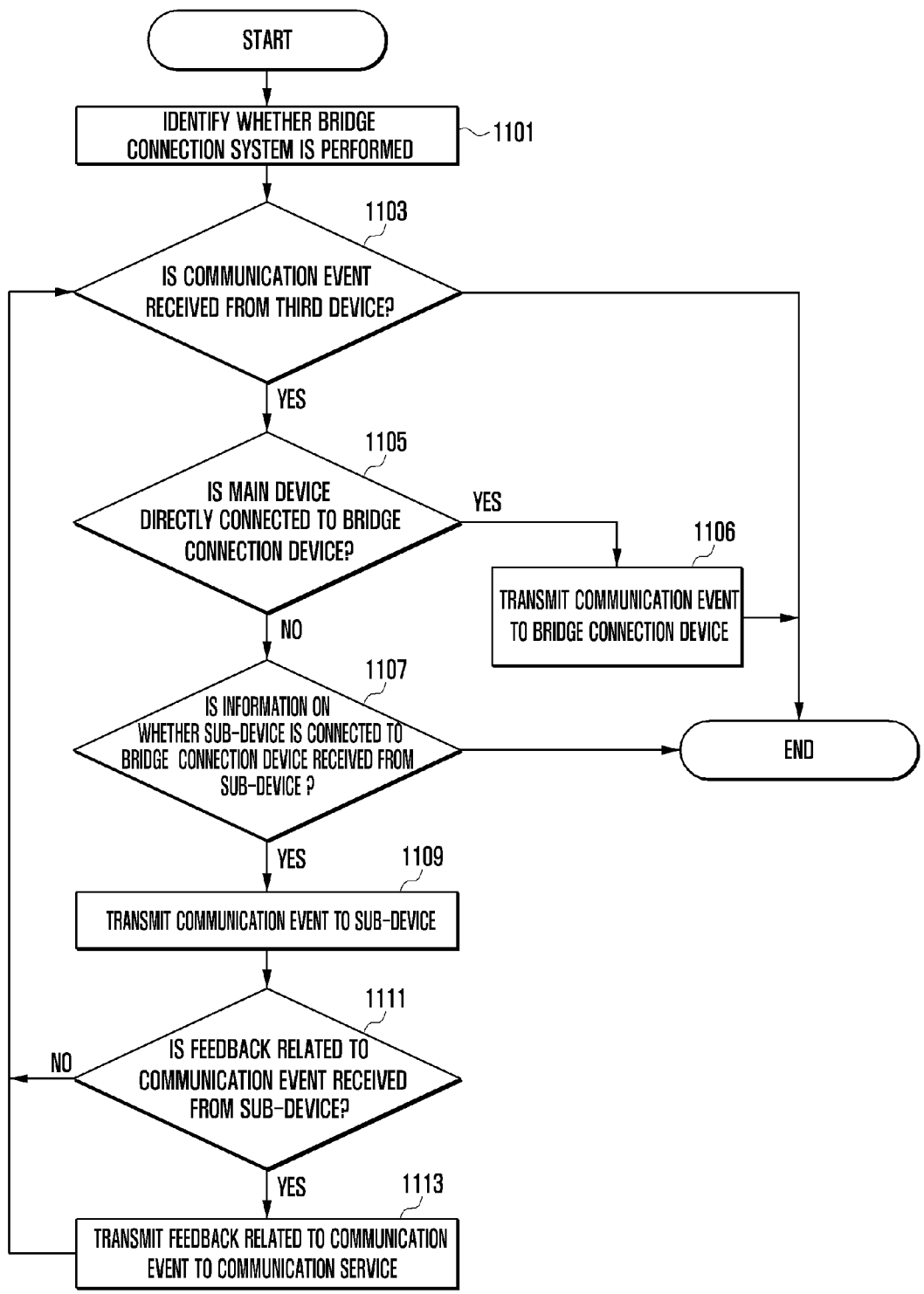
FIG. 11 is a flowchart of a method of transmitting and receiving a random event of a main device according to an embodiment of the present invention that does not use a server.

FIG. 11 is a flowchart of a method of transmitting and receiving a random event (e.g. a communication event) of a main device according to an embodiment of the present invention that does not use a server.

Referring to FIG. 11, according to an embodiment of the present invention, in step 1101, the main device 410 may identify whether the bridge connection system is performed. In the bridge connection system 300 or 400, the main device 410, the sub-device 420 and the bridge connection device 440 are included in one local group, and the main device 410 may perform the bridge connection function using the bridge connection system 300 or 400. In addition, the main device 410, the sub-device 420 and the bridge connection device 440 may register at least one of each piece of information (e.g., a MAC address or an IP address) in one local group to form the bridge connection system 300.

According to an embodiment of the present invention, in step 1103, when the main device 410 receives the random event requested from the third electronic device 503 from the communication service 501 (or network 162 in FIG. 1), the main device 410 may perform step 1105 to determine whether the main device 410 is connected to the bridge connection device 440. Otherwise, the method terminates.

According to an embodiment of the present invention, in step 1105, the main device 410 may determine whether the main device 410 is connected to the bridge connection device 440.

According to an embodiment of the present invention, in step 1105, when the main device 410 is connected to the bridge connection device 440, the main device 410 may perform step 1106 to transmit the data related to the random event to the bridge connection device 440. Then, the method terminates.

According to an embodiment of the present invention, in step 1105, when the main device 410 is not connected to the bridge connection device 440, the main device 410 may perform step 1107 to receive, from the sub-device 420, information on whether the sub-device 420 is connected to the bridge connection device 440.

According to an embodiment of the present invention, in step 1107, when the main device 410 receives, from the sub-device 420, the information on whether the sub-device 420 is connected to the bridge connection device 440, the main device 420 may perform step 1109 to transmit the data related to the random event to the sub-device 420. Otherwise, the method terminates.

According to an embodiment of the present invention, in step 1111, the main device 410 may determine whether the main device 410 receives the feedback related to the random event from the sub-device 420.

According to an embodiment of the present invention, in step 1111, when the main device 410 does not receive the feedback related to the random event from the sub-device 420, the main device 410 may perform step 1103 to determine whether the main device 410 additionally receives the random event.

According to an embodiment of the present invention, in step 1111, when the main device 410 receives the feedback related to the random event from the sub-device 420, the main device 410 may perform step 1113 to transmit the feedback related to the random event using the communication service 501 (or the network 162 in FIG. 1). Then, the main device 410 may perform step 1103 to determine whether the main device 410 additionally receives the random event.

Figure 12:
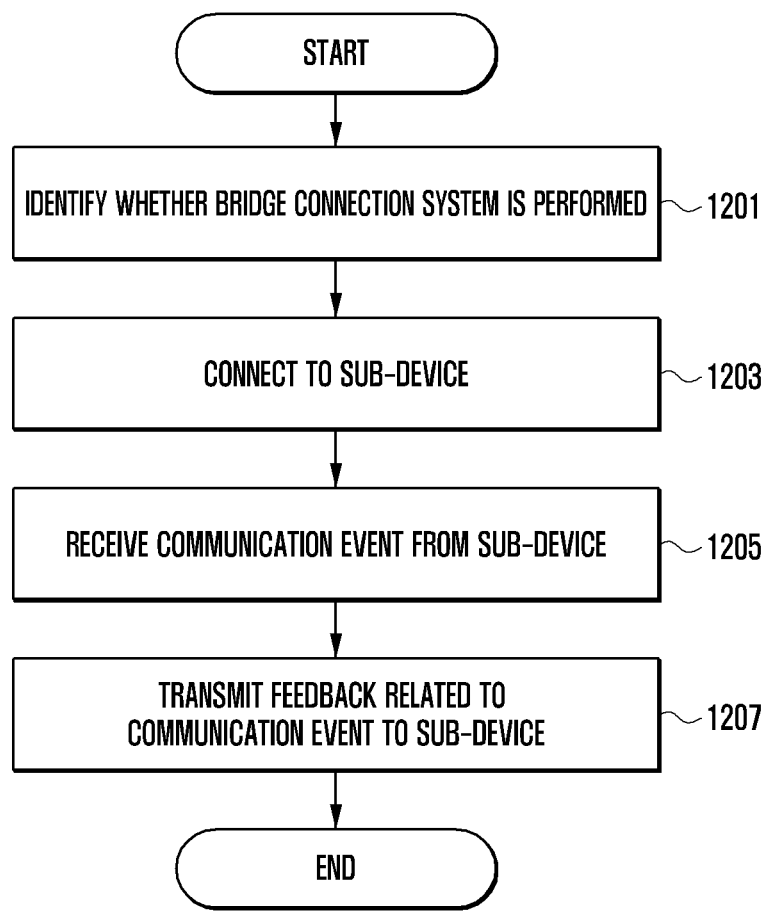
FIG. 12 is a flowchart of a method of transmitting and receiving a random event of a bridge connection device according to an embodiment of the present invention that does not use a server.

FIG. 12 is a flowchart of a method of transmitting and receiving a random event of a bridge connection device according to an embodiment of the present invention that does not use a server.

Referring to FIG. 12, according to an embodiment of the present invention, in step 1201, the bridge connection device 440 may identify whether the bridge connection system is performed. In the bridge connection system 300 or 400, the main device 410, the sub-device 420 and the bridge connection device 440 are included in one account, and the bridge connection device 440 may perform the bridge connection function using the bridge connection system 300 or 400. In addition, the main device 410, the sub-device 420 and the bridge connection device 440 may register at least one of each piece of information (e.g., a MAC address and an IP address) in one account to form the bridge connection system 300. In this case, the bridge connection device 440 may receive the MAC addresses of the main device 410 and the sub-device 420, store the MAC addresses of the main device 410 and the sub-device 420, and use the MAC addresses of the main device 410 and the sub-device 420 in the connection to each device.

According to the present invention, in step 1203, the bridge connection device 440 may be connected to the sub-device 420 using the MAC address of the sub-device 420, which is previously stored in the memory 230.

According to the present invention, in step 1205, the bridge connection device 440 may receive, from the sub-device 420, the data related to the random event generated from the third electronic device 503. For example, the bridge connection device 440 may receive the notification related to the call connection request from the sub-device 420.

According to the present invention, in step 1207, the bridge connection device 440 may transmit the feedback related to the random event generated from the third electronic device 503 to the sub-device 420. For example, the bridge connection device 440 may transmit the notification of the answer of the call connection request to the sub-device 420.

Figure 13:
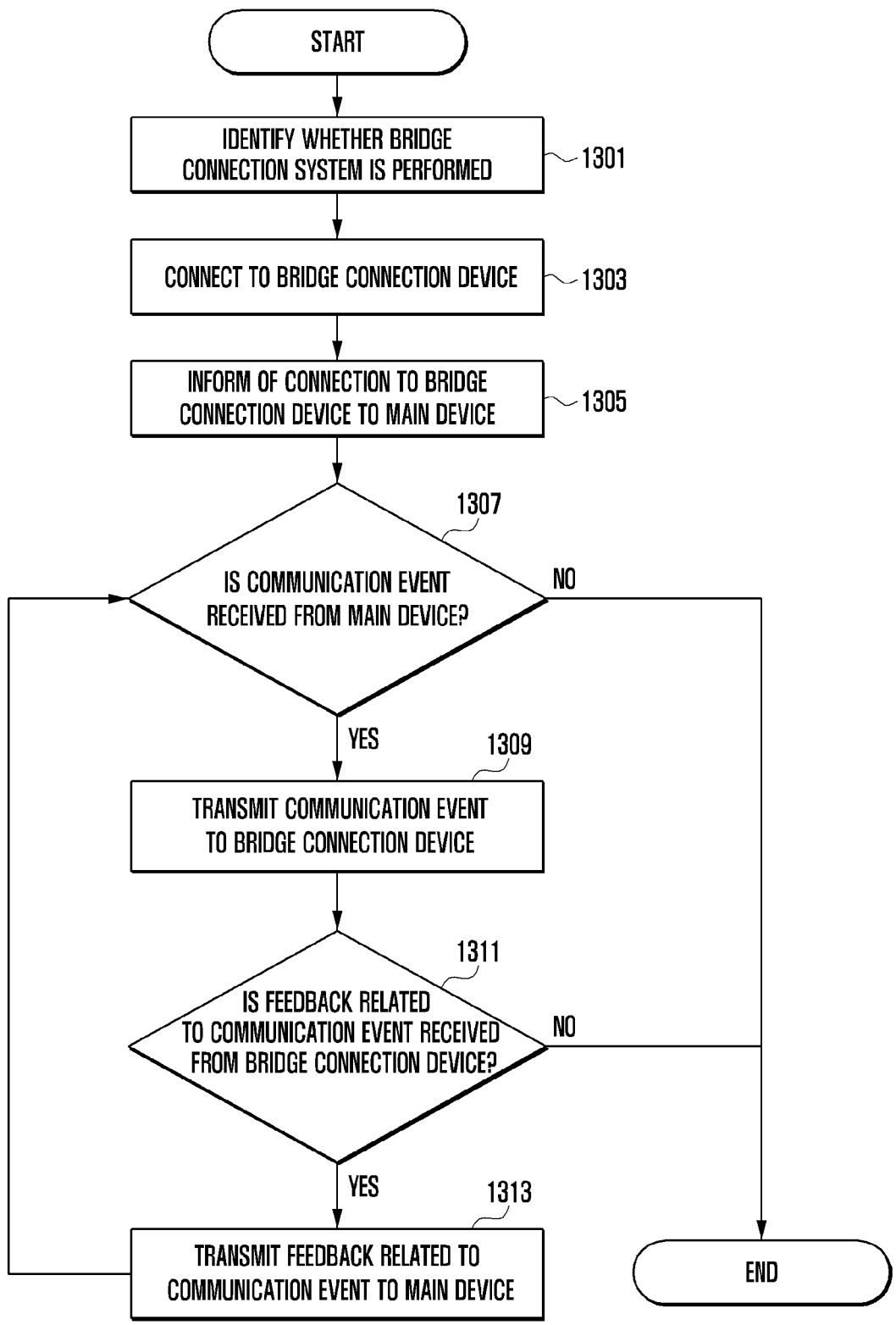
FIG. 13 is a flowchart of a method of transmitting and receiving a random event of a sub-device according to an embodiment of the present invention that does not use a server.

FIG. 13 is a flowchart of a method of transmitting and receiving a random event of a sub-device according to an embodiment of the present invention that does not use a server.

Referring to FIG. 13, according to an embodiment of the present invention, in step 1301, the sub-device 420 may identify whether the bridge connection system is performed. In the bridge connection system 300 or 400, the main device 410, the sub-device 420 and the bridge connection device 440 are included in one account, and the main device 410 may perform the bridge connection function using the bridge connection system 300 or 400. In addition, the main device 410, the sub-device 420 and the bridge connection device 440 may register at least one of each piece of information (e.g., a MAC address and an IP address) in one account to form the bridge connection system 300.

According to an embodiment of the present invention, in step 1303, the sub-device 420 may be connected to the bridge connection device 440. The sub-device 420 may receive a connection request from the bridge connection device 440. When the sub-device 420 approves the connection request, the sub-device 420 may be connected to the bridge connection device 440. In a state in which the sub-device 420 is connected to the bridge connection device 440, the sub-device 420 may receive, from the main device 410, a random event (e.g. a communication event) generated from the main device 410, and may transfer the random event to the bridge connection device 440. That is, the sub-device 420 may act as a bridge between the main device 410 and the bridge connection device 440.

According to of each pieces of information of the present invention, in step 1305, the sub-device 420 may transmit information on whether the sub-device 420 is connected to the bridge connection device 440 to the main device 410.

According to an embodiment of the present invention, in step 1307, the sub-device 420 may determine whether the sub-device 420 receives, from the main device 410, the data related to the random event generated from the main device 410.

According to an embodiment of the present invention, in step 1307, when the sub-device 420 receives, from the main device 410, the data related to the random event, the sub-device 420 may perform step 1309 to transmit the data related to the random event to the bridge connection device 440. Otherwise, the method terminates.

According to an embodiment of the present invention, in step 1311, the sub-device 420 may determine whether the sub-device 420 receives the feedback related to the random event from the bridge connection device 440.

According to an embodiment of the present invention, in step 1311, when the sub-device 420 receives the feedback related to the random event from the bridge connection device 440, the sub-device 420 may perform step 1313 to transmit the feedback related to the random event to the main device 410. Then, the sub-device 420 may perform step 1307 to determine whether the sub-device 420 additionally receives the random event. Otherwise, the method terminates.

Figure 14:
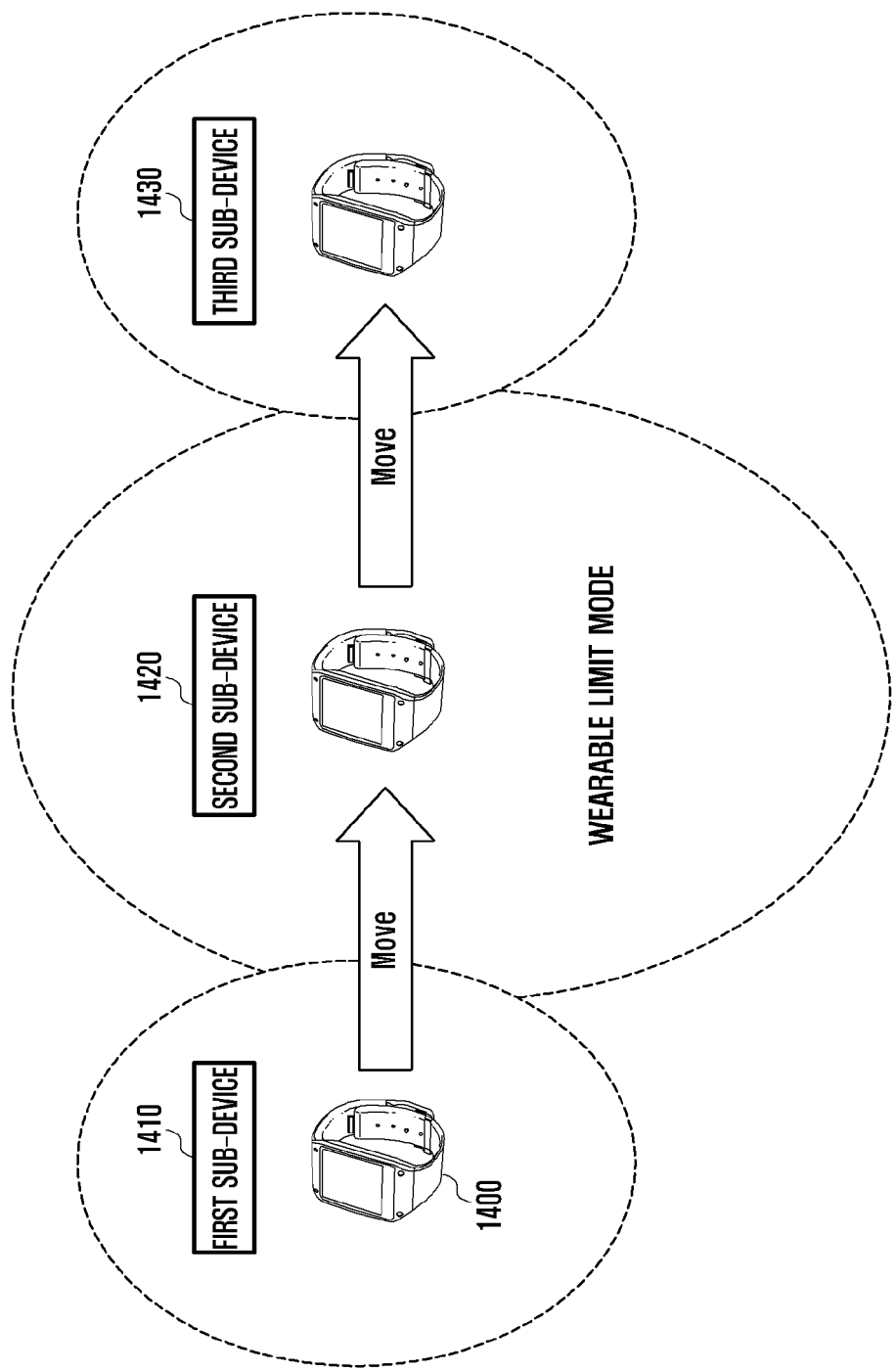
FIG. 14 is a diagram of a method of limiting a transferal of a random event generated from a main device correspondingly to a wirelessly connected sub-device of an electronic device according to an embodiment of the present invention.

FIG. 14 is a diagram of a method of limiting a transfer of a random event (e.g. a communication event) generated from a main device corresponding to a connected sub-device of an electronic device according to an embodiment of the present invention.

Referring to FIG. 14, according to an embodiment of the present invention, a user of the electronic device 1400 may carry an electronic device 1400. In this case, the electronic device 1400 may be defined as the bridge connection device 440. That is, the electronic device 1400 may be an electronic device capable of receiving a random event (e.g. a communication event) of the main device 410 through at least one sub-device. The bridge connection system 300 of the electronic device 1400 may include a first sub-device 1410, a second sub-device 1420 and a third sub-device 1430. In this case, at least one among pieces of information (e.g., a MAC address) of each sub-device may be stored in the memory 230 of the electronic device 1400.

According to an embodiment of the present invention, when the electronic device 1400 executes a bridge connection mode, the electronic device 1400 may limit and execute a random event function to the connected sub-device 420. That is, the electronic device 1400 may configure a function corresponding to the sub-device 420 registered in the bridge connection system 300 through the bridge connection execution module 320. For example, the first sub-device 1410 and the third sub-device 1430 may be personal devices of the user of the electronic device 1400, and the second sub-device 1420 may be a public device by a Bluetooth zone. In addition, the Bluetooth zone is a space exposed to the general public, and the Bluetooth zone's security may be vulnerable. Therefore, when the user of the electronic device 1400 receives the random event of the main device 410 through the second sub-device 1420, it is necessary for the user to be aware of the exposure of information.

In an embodiment of the present invention, when the electronic device 1400 receives a call event through the second sub-device 1420, the electronic device 1400 may receive only a call request notification from the third electronic device 503. That is, the electronic device 1400 may configure the sub-device 1420 so as not to perform a call connection through the second sub-device 1420. Thus, a leakage of conversation contents of the user of the electronic device 1400 may be prevented.

In another embodiment of the present invention, when the electronic device 1400 receives a message event from the second sub-device 1420, the electronic device 1400 may receive only a message arrival notification from the third electronic device 503. That is, the electronic device 1400 may configure the sub-device 1420 so as not to identify message content through the second sub-device 1420. Thus, a leakage of the message content of the user of the electronic device 1400 may be prevented.

Figure 15:
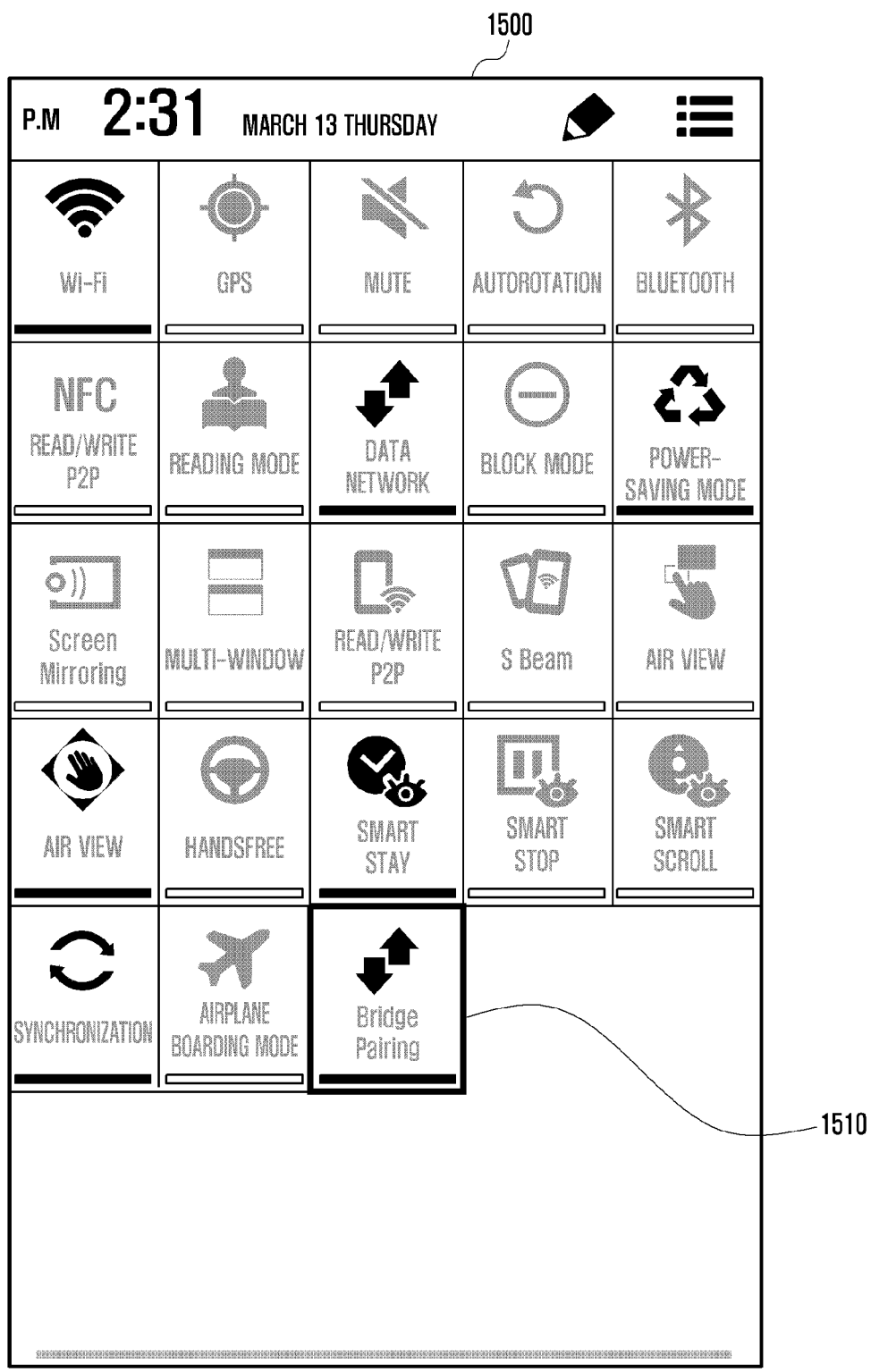
FIG. 15 is a diagram of a User Interface (UI) which activates a bridge connection function of an electronic device according to an embodiment of the present invention.

FIG. 15 is a diagram of a User Interface (UI) which activates a bridge connection function of an electronic device according to an embodiment of the present invention.

Referring to FIG. 15, according to an embodiment of the present invention, the electronic device 101 or 201 may output a screen 1500 for activating at least one function. When the electronic device 101 or 201 executes the bridge connection function using Bluetooth, the electronic device 101 or 201 may select bridge pairing 1510 in the screen 1500 to activate the bridge connection system 300 or 400. In addition, the electronic device 101 or 201 may be changed to an additional configuration operation besides the screen 1500 to activate the bridge connection system 300 or 400.

Figure 16:
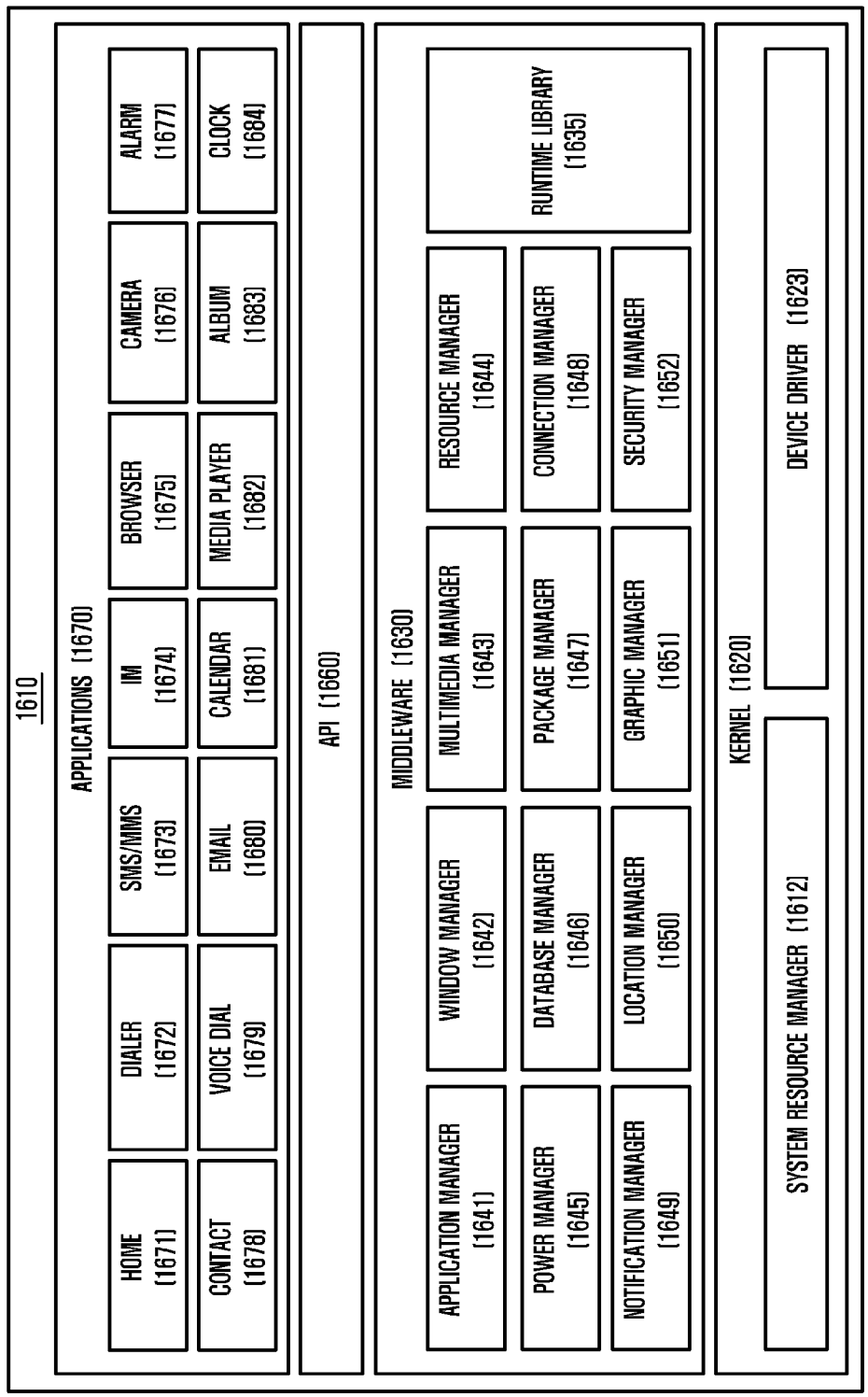
FIG. 16 is a block diagram of a program module according to an embodiment of the present invention.

FIG. 16 is a block diagram of a programming module 1610 according to an embodiment of the present invention.

The programming module 1610 may be included (or stored) in the electronic device 101 (e.g., in the memory 130) or may be included (or stored) in the electronic device 201 (e.g., in the memory 230) illustrated in FIG. 1. At least a part of the programming module 1610 may be implemented in software, firmware, hardware, or a combination of two or more thereof. The programming module 1610 may be implemented in hardware (e.g., the hardware 201), and may include an Operating System (OS) controlling resources related to the electronic device 101 and/or various applications (e.g., an application 1670) executed in the OS. For example, the OS may be Android, iOS, Windows®, Symbian, Tizen™, Bada, and the like.

Referring to FIG. 16, the programming module 1610 may include a kernel 1620, a middleware 1630, an API 1660, and/or applications 1670.

The kernel 1620 (e.g., the kernel 131 of FIG. 1) may include a system resource manager 1612 and/or a device driver 1623. The system resource manager 1612 may include, for example, a process manager, a memory manager, and a file system manager. The system resource manager 1612 may perform the control, allocation, recovery functions, and/or the like of system resources. The device driver 1623 may include, for example, a display driver, a camera driver, a Bluetooth driver, a shared memory driver, a USB driver, a keypad driver, a Wi-Fi driver, and/or an audio driver. In addition, according to an embodiment of the present invention, the device driver 1623 may include an Inter-Process Communication (IPC) driver.

The middleware 1630 may include multiple modules previously implemented so as to provide a function used in common by the applications 1670. In addition, the middleware 1630 may provide a function to the applications 1670 through the API 1660 in order to enable the applications 1670 to efficiently use limited system resources within the electronic device. For example, as illustrated in FIG. 16, the middleware 1630 (e.g., the middleware 132 of FIG. 1) may include at least one of a runtime library 1635, an application manager 1641, a window manager 1642, a multimedia manager 1643, a resource manager 1644, a power manager 1645, a database manager 1646, a package manager 1647, a connection manager 1648, a notification manager 1649, a location manager 1650, a graphic manager 1651, a security manager 1652, and any other suitable and/or similar manager.

The runtime library 1635 may include, for example, a library module used by a compiler, in order to add a new function by using a programming language during the execution of the applications 1670. According to an embodiment of the present invention, the runtime library 1635 may perform functions which are related to input and output, the management of a memory, an arithmetic function, and/or the like.

The application manager 1641 may manage, for example, a life cycle of at least one of the applications 1670. The window manager 1642 may manage Graphical User Interface (GUI) resources used on a screen. The multimedia manager 1643 may detect a format used to reproduce various media files and may encode or decode a media file through a coder/decoder (codec) appropriate for the relevant format. The resource manager 1644 may manage resources, such as source code, memory, storage space, and/or the like of at least one of the applications 1670.

The power manager 1645 may operate with a Basic Input/Output System (BIOS), may manage a battery or power, and may provide power information and the like used for an operation. The database manager 1646 may manage a database in such a manner as to enable the generation, search and/or change of the database to be used by at least one of the applications 1670. The package manager 1647 may manage the installation and/or update of an application distributed in the form of a package file.

The connectivity manager 1648 may manage wireless connectivity such as, for example, WiFi and Bluetooth. The notification manager 1649 may display or report, to a user, an event such as an arrival message, an appointment, a proximity alarm, and the like in such a manner as to not disturb the user. The location manager 1650 may manage location information of the electronic device. The graphic manager 1651 may manage a graphic effect, which is to be provided to the user, and/or a user interface related to the graphic effect. The security manager 1652 may provide various security functions used for system security, user authentication, and the like. According to an embodiment of the present invention, when the electronic device (e.g., the electronic device 101) has a telephone function, the middleware 1630 may further include a telephony manager for managing a voice telephony call function and/or a video telephony call function of the electronic device.

The middleware 1630 may generate and use a middleware module through various functional combinations of the above-described internal element modules. The middleware 1630 may provide modules specialized according to types of OSs in order to provide differentiated functions. In addition, the middleware 1630 may dynamically delete some of the existing elements, or may add new elements. Accordingly, the middleware 1630 may omit some of the elements described in an embodiment of the present invention, further include other elements, or replace some of the elements with elements, each of which performs a similar function but has a different name.

The API 1660 (e.g., the API 133 of FIG. 1) is a set of API programming functions, and may be provided with a different configuration according to an OS. In the case of Android or iOS, for example, one API set may be provided to each platform. In the case of Tizen™, for example, two or more API sets may be provided to each platform.

The applications 1670 (e.g., the applications 134 of FIG. 1) may include, for example, a preloaded application and/or a third party application. The applications 1670 (e.g., the applications 134 of FIG. 1) may include, for example, a home application 1671, a dialer application 1672, a Short Message Service (SMS)/Multimedia Message Service (MMS) application 1673, an Instant Messaging (IM) application 1674, a browser application 1675, a camera application 1676, an alarm application 1677, a contact application 1678, a voice dial application 1679, an electronic mail (e-mail) application 1680, a calendar application 1681, a media player application 1682, an album application 1683, a clock application 1684, and any other suitable and/or similar application.

At least a part of the programming module 1610 may be implemented by instructions stored in a non-transitory computer-readable storage medium. When the instructions are executed by one or more processors (e.g., the one or more processors 210 in FIG. 1), the one or more processors may perform functions corresponding to the instructions. The non-transitory computer-readable storage medium may be, for example, the memory 220. At least a part of the programming module 1610 may be implemented (e.g., executed) by, for example, the one or more processors 210. At least a part of the programming module 1610 may include, for example, a module, a program, a routine, a set of instructions, and/or a process for performing one or more functions.

A method of operating an electronic device according to an embodiment of the present invention may include detecting a generation of an event based on at least one of a signal received externally and an internal operation, by the electronic device including a cellular communication module, a first short range wireless communication module and a second short range wireless communication module; determining a state of a connection between the electronic device and a first external electronic device that has been connected to the electronic device using the first short range wireless communication module, by the electronic device; and transmitting a signal related to the event, using at least one of the cellular communication module, the first short range wireless communication module and the second short range wireless communication module, based on at least some of the states of the connection, by the electronic device.

Transmitting the signal may include transmitting the signal related to the event to a second external electronic device using at least one of the cellular communication module and the second short range wireless communication module, by the electronic device, when the electronic device is not connected to the first external electronic device.

The first external electronic device may include a wearable device, and the second external electronic device may include a server.

The first external electronic device may include a wearable device, and the second external electronic device may include another electronic device.

Transmitting the signal may include transmitting the signal related to the event to a second external electronic device using at least one of the cellular communication module and the second short range wireless communication module, by the electronic device, when the electronic device is not connected to the first external electronic device, and where the signal related to the event may be configured to be transferred from the second external electronic device to the first external electronic device.

The first external electronic device may include a wearable device, and the second external electronic device may include a server, or another electronic device.

The signal related to the event may be configured to be transferred from the second external electronic device to the first external electronic device through the third external electronic device.

The first external electronic device may include a wearable device, the second external electronic device may include a server, and the third external electronic device may include another electronic device.

Transmitting the signal may include determining whether an alarm, which indicates that the second external electronic device is connected to the first external electronic device, is received from the second external electronic device; and when the alarm is received from the second external electronic device, transmitting the signal related to the event to the second external electronic device.

The case in which the electronic device is not connected to the first external electronic device may include at least one of a case in which a distance between the electronic device and the first external electronic device is greater than a transmittable and receivable distance and thus the connection between the electronic device and the first external electronic device is disconnected, and a case in which the electronic device disconnects the connection between the electronic device and the first external electronic device.

The event may include at least one of playing music, navigation execution, a call request, a Short Message Service (SMS) and a Multimedia Messaging Service (MMS).

The short range wireless communication module may include at least one of a Radio Frequency IDentification (RFID), ZigBee, an Infrared Data Association (IrDA) and an Ultra WideBand (UWB).

A method of operating an electronic device according to an embodiment of the present invention may include detecting a generation of an event based on at least one of a signal received externally and an internal operation, by the electronic device including a wireless communication module and a second wireless communication module; determining whether the electronic device is connected to a first external electronic device that has been connected to the electronic device using the first wireless communication module, by the electronic device; and transferring information on whether the event is generated and a signal related to the event to the first external electronic device, using the second wireless communication module, by the electronic device, when the connection is disconnected.

A method of operating a wearable electronic device according to an embodiment of the present invention may include determining a state of a connection between the wearable electronic device and a first external electronic device that has been connected to the wearable electronic device using a first short range wireless communication module, by the wearable electronic device including the first short range wireless communication module; and receiving, from a second external electronic device, a signal related to an event generated in the first external electronic device, using at least one of the first short range wireless communication module and the second short range wireless communication module, based on at least some of the states of the connection, by the wearable electronic device.

A method of operating an electronic device according to an embodiment of the present invention may include connecting the electronic device to a first external electronic device using a short range wireless communication module; transmitting information on whether the electronic device is connected to the first external electronic device to a second external electronic device, when the electronic device is connected to the first external electronic device; receiving a signal related to an event based on at least one of a signal received externally to the second external electronic device and an internal operation, from the second external electronic device; and transmitting the signal related to the event to the first external electronic device.

The first external electronic device may include a wearable device.

According to another aspect of the present invention, a chip set for operating an electronic device is provided. The chip set is configured to detect a generation of an event based on at least one of a signal received externally and an internal operation, by the electronic device including a cellular communication module, a first short range wireless communication module and a second short range wireless communication module; determine at least one state of a connection between the electronic device and a first external electronic device that has been connected to the electronic device using the first short range wireless communication module, by the electronic device; and transmit a signal related to the event, using at least one of the cellular communication module, the first short range wireless communication module and the second short range wireless communication module, based on at least one of the at least one state of the connection between the electronic device and the first external electronic device, by the electronic device.

Examples of non-transitory computer-readable media include magnetic media, such as hard disks, floppy disks, and magnetic tape; optical media such as Compact Disc Read Only Memory (CD-ROM) disks and a Digital Versatile Disc (DVD); magneto-optical media, such as floptical disks; and hardware devices that are configured to store and perform program instructions (e.g., programming modules), such as a ROM, a RAM, a flash memory, etc. Examples of program instructions include machine code instructions generated using assembly languages, such as by a compiler, and code instructions created using a high-level programming language executable in computers using an interpreter, etc. The hardware devices described above may be configured to act as one or more software modules in order to perform the operations and methods described above, or vice versa.

Modules or programming modules according to an embodiment of the present invention may include one or more components, remove part of them described above, or include new components. The operations performed by modules, programming modules, or the other components, according to the present invention, may be executed in serial, parallel, repetitive or heuristic fashion. Part of the operations can be executed in any order, skipped, or executed with additional operations.

Although embodiments of the present invention have been described in detail above, it should be understood that many variations and modifications of the present invention described herein, which may be apparent to those skilled in the art, will may fall within the scope and spirit of the present invention as defined by the appended claims and their equivalents.

What is claimed is:

1. A method of operating an electronic device, the method comprising:
   detecting a generation of an event based on at least one of a signal received externally and an internal operation, by the electronic device including a cellular communication module, a first short range wireless communication module and a second short range wireless communication module;
   determining at least one state of a connection between the electronic device and a first external electronic device that has been connected to the electronic device using the first short range wireless communication module, by the electronic device; and
   transmitting a signal related to the event, using at least one of the cellular communication module, the first short range wireless communication module and the second short range wireless communication module, based on at least one of the at least one state of the connection between the electronic device and the first external electronic device, by the electronic device,
   wherein transmitting the signal related to the event comprises transmitting the signal related to the event to a second external electronic device, using at least one of the cellular communication module and the second short range wireless communication module, by the electronic device, if the electronic device is not connected to the first external electronic device, and
   wherein the signal related to the event is configured to be transferred from the second external electronic device to the first external electronic device.

2. The method of claim 1, wherein the first external electronic device includes a wearable device, and the second external electronic device includes a server.

3. The method of claim 1, wherein the first external electronic device includes a wearable device, and the second external electronic device includes another electronic device.

4. The method of claim 1, wherein the first external electronic device includes a wearable device, and the second external electronic device includes a server.

5. The method of claim 1, wherein the first external electronic device includes a wearable device, and the second external electronic device includes another electronic device.

6. The method of claim 1, wherein the signal related to the event is configured to be transferred from the second external electronic device to the first external electronic device through a third external electronic device.

7. The method of claim 6, wherein the first external electronic device includes a wearable device, the second external electronic device includes a server, and the third external electronic device includes another electronic device.

8. The method of claim 1, wherein transmitting the signal related to the event comprises:
   determining whether an alarm which indicates that the second external electronic device is connected to the first external electronic device is received from the second external electronic device; and
   if the alarm is received from the second external electronic device, transmitting the signal related to the event to the second external electronic device.

9. The method of claim 1, wherein if the electronic device is not connected to the first external electronic device then a distance between the electronic device and the first external electronic device is greater than a transmittable and receivable distance and the connection between the electronic device and the first external electronic device was disconnected or the electronic device disconnected the electronic device and the first external electronic device.

10. The method of claim 1, wherein the event includes at least one of playing music, navigation execution, a call request, a Short Message Service (SMS) and a Multimedia Messaging Service (MMS).

11. The method of claim 1, wherein each of the first short range wireless communication module and the second short range wireless communication module includes at least one of a Radio Frequency IDentification (RFID) protocol, a ZigBee protocol, an Infrared Data Assocation (IrDA) protocol and an Ultra WideBand (UWB) protocol.

12. A method of operating an electronic device, the method comprising:
   detecting, by the electronic device, a generation of an event based on at least one of a signal received externally and an internal operation, the electronic device including a first wireless communication module and a second wireless communication module;
   determining, by the electronic device, whether the electronic device is connected to a first external electronic device that has been connected to the electronic device using the first wireless communication module; and
   transferring, by the electronic device, information on whether the event is generated to the first external electronic device, by transmitting a signal related to the event using the second wireless communication module, if the electronic device is disconnected from the first external electronic device.

13. A method of operating a wearable electronic device, the method comprising:
   determining at least one state of a connection between the wearable electronic device and a first external electronic device that has been connected to the wearable electronic device using a first short range wireless communication module, by the wearable electronic device including the first short range wireless communication module; and
   receiving, from a second external electronic device, a signal related to an event generated in the first external electronic device, using at least one of the first short range wireless communication module and the second short range wireless communication module, based on at least the determined state of the connection between the wearable electronic device and the first external electronic device, by the wearable electronic device, in particular if the wearable electronic device is not connected to the first external electronic device.

14. A method of operating an electronic device, the method comprising:
   connecting the electronic device to a first external electronic device using a short range wireless communication module;
   transmitting information on whether the electronic device is connected to the first external electronic device to a second external electronic device, if the electronic device is connected to the first external electronic device;
   receiving a signal from the second external electronic device related to an event based on at least one of a signal received externally by the second external electronic device and an internal operation of the second external electronic device, in particular if the first external electronic device is not connected to the second external electronic device; and
   transmitting the signal related to the event to the first external electronic device.

15. The method of claim 14, wherein the first external electronic device includes a wearable device.

16. An electronic device, comprising:
   a cellular communication module;
   a first short range wireless communication module;
   a second short range wireless communication module;
   a processor connected to the cellular communication module, the first short range wireless communication module and the second short range wireless communication module, and configured to detect a generation of an event based on at least one of a signal received externally and an internal operation; determine a state of a connection between the electronic device and a first external electronic device that has been connected to the electronic device using the first short range wireless communication module; and transmit a signal related to the event, using at least one of the cellular communication module, the first short range wireless communication module and the second short range wireless communication module, based on at least the determined state of the connection; and
   a memory,
   wherein the processor is configured to transmit the signal related to the event by transmitting the signal related to the event to a second external electronic device, using at least one of the cellular communication module and the second short range wireless communication module, by the electronic device, if the electronic device is not connected to the first external electronic device, and
   wherein the signal related to the event is configured to be transferred from the second external electronic device to the first external electronic device.

17. The electronic device of claim 16, wherein the first external electronic device includes a wearable device, and the second external electronic device includes a server.

18. The electronic device of claim 16, wherein the first external electronic device includes a wearable device, and the second external electronic device includes another electronic device.

19. The electronic device of claim 16, wherein the first external electronic device includes a wearable device, and the second external electronic device includes a server.

20. The electronic device of claim 16, wherein the first external electronic device includes a wearable device, and the second external electronic device includes another electronic device.

21. The electronic device of claim 16, wherein the signal related to the event is transferred from the second external electronic device to the first external electronic device through a third external electronic device.

22. The electronic device of claim 21, wherein the first external electronic device includes a wearable device, the second external electronic device includes a server, and the third external electronic device includes another electronic device.

23. The electronic device of claim 16, wherein the electronic device is further configured to determine whether an alarm which indicates that the second external electronic device is connected to the first external electronic device is received from the second external electronic device; and
   if the alarm is received from the second external electronic device, transmit the signal related to the event to the second external electronic device.

24. The electronic device of claim 16, wherein if the electronic device is not connected to the first external electronic device then a distance between the electronic device and the first external electronic device is greater than a transmittable and receivable distance and the connection between the electronic device and the first external electronic device is disconnected, or the electronic device disconnected the connection between the electronic device and the first external electronic device.

25. The electronic device of claim 16, wherein the event includes at least one of playing music, navigation execution, a call request, a Short Message Service (SMS) and a Multimedia Messaging Service (MMS).

26. The electronic device of claim 16, wherein the first short range wireless communication module includes at least one of a Radio Frequency IDentification (RFID) protocol, ZigBee protocol, an Infrared Data Assocation (IrDA) protocol and an Ultra WideBand (UWB) protocol.

27. An electronic device, comprising:
a first wireless communication module;
a second wireless communication module;
a processor connected to the first wireless communication module and the second wireless communication module, and configured to
detect a generation of an event based on at least one of a signal received externally and an internal operation;
determine whether the electronic device is connected to a first external electronic device that has been connected to the electronic device using the first wireless communication module; and
transfer information on whether the event is generated to the first external electronic device, by transmitting a signal related to the event using the second wireless communication module, if it is determined that the connection is disconnected; and
a memory.

28. An electronic device, comprising:
a first short range wireless communication module;
a second short range wireless communication module;
a processor connected to the first short range wireless communication module and the second short range wireless communication module, and configured to:
determine a state of a connection between the wearable electronic device and a first external electronic device that has been connected to the wearable electronic device using the first short range wireless communication module; and
receive, from a second external electronic device, a signal related to an event generated in the first external electronic device, using at least one of the first short range wireless communication module and the second short range wireless communication module, based on at least the determined state of the connection, in particular if the wearable electronic device is not connected to the first external electronic device; and
a memory.

29. An electronic device, comprising:
a short range wireless communication module;
a processor connected to the short range wireless communication module, and configured to:
connect the electronic device to a first external electronic device using the short range wireless communication module;
transmit information on whether the electronic device is connected to the first external electronic device to a second external electronic device, if the electronic device is connected to the first external electronic device;
receive a signal from the second external electronic device related to an event based on at least one of a signal received externally by the second external electronic device and an internal operation of the second external electronic device, in particular if the wearable electronic device is not connected to the first external electronic device; and
transmit the signal related to the event to the first external electronic device; and
a memory.

30. The electronic device of claim 29, wherein the first external electronic device includes a wearable device.

31. A chip set for operating an electronic device, configured to:
detect a generation of an event based on at least one of a signal received externally and an internal operation, by the electronic device including a cellular communication module, a first short range wireless communication module and a second short range wireless communication module;
determine at least one state of a connection between the electronic device and a first external electronic device that has been connected to the electronic device using the first short range wireless communication module, by the electronic device; and
transmit a signal related to the event, using at least one of the cellular communication module, the first short range wireless communication module and the second short range wireless communication module, based on at least one of the at least one state of the connection between the electronic device and the first external electronic device, by the electronic device,
wherein the chip set is configured to transmit the signal related to the event by transmitting the signal related to the event to a second external electronic device, using at least one of the cellular communication module and the second short range wireless communication module, by the electronic device, if the electronic device is not connected to the first external electronic device, and
wherein the signal related to the event is configured to be transferred from the second external electronic device to the first external electronic device.

* * * * *